(12) United States Patent
Putluru et al.

(10) Patent No.: US 8,685,354 B2
(45) Date of Patent: Apr. 1, 2014

(54) HETEROPOLY ACID PROMOTED CATALYST FOR SCR OF NOX WITH AMMONIA

(75) Inventors: Siva Sankar Reddy Putluru, KGS. Lyngby (DK); Anders Riisager, Taastrup (DK); Rasmus Fehrmann, Kobenhavn O (DK)

(73) Assignee: Danmarks Tekniske Universitet, KGS. Lyngby (DK)

( * ) Notice: Subject to any disclaimer, the term of this patent is extended or adjusted under 35 U.S.C. 154(b) by 0 days.

(21) Appl. No.: 13/820,487

(22) PCT Filed: Aug. 29, 2011

(86) PCT No.: PCT/EP2011/064793
§ 371 (c)(1),
(2), (4) Date: Mar. 12, 2013

(87) PCT Pub. No.: WO2012/028566
PCT Pub. Date: Mar. 8, 2012

(65) Prior Publication Data
US 2013/0164205 A1 Jun. 27, 2013

Related U.S. Application Data

(60) Provisional application No. 61/380,025, filed on Sep. 3, 2010.

(30) Foreign Application Priority Data

Sep. 3, 2010 (EP) .................................... 10009178

(51) Int. Cl.
*B01D 53/56* (2006.01)
*B01J 23/88* (2006.01)
*B01J 23/888* (2006.01)
*B01J 37/00* (2006.01)

(52) U.S. Cl.
USPC ........ 423/239.1; 502/100; 502/210; 502/211; 502/232; 502/254; 502/325; 502/345; 502/353

(58) Field of Classification Search
USPC ............... 423/239.1; 502/100, 210, 211, 232, 502/254, 325, 345, 353
See application file for complete search history.

(56) References Cited

U.S. PATENT DOCUMENTS

| | | | |
|---|---|---|---|
| 4,182,745 A | 1/1980 | Nishida et al. | |
| 4,798,813 A | 1/1989 | Kato et al. | |
| 4,961,917 A | 10/1990 | Byrne | |
| 5,059,569 A | 10/1991 | Deschamps et al. | |
| 5,260,043 A | 11/1993 | Li et al. | |
| 5,456,892 A * | 10/1995 | Yang et al. ................. | 423/239.1 |
| 5,523,068 A * | 6/1996 | Yang et al. ................. | 423/239.1 |
| 5,753,581 A | 5/1998 | Beckmeyer et al. | |
| 7,005,116 B2 | 2/2006 | Schafer-Sindlinger et al. | |
| 7,182,927 B2 | 2/2007 | Tran et al. | |
| 7,264,785 B2 | 9/2007 | Blakeman et al. | |
| 2006/0084569 A1 | 4/2006 | Augustine et al. | |
| 2007/0134146 A1 | 6/2007 | Bull et al. | |
| 2008/0127638 A1 | 6/2008 | Vaarkamp et al. | |
| 2010/0075834 A1 | 3/2010 | Hurgobin et al. | |

FOREIGN PATENT DOCUMENTS

| | | |
|---|---|---|
| DE | 37 22 081 A1 | 1/1988 |
| DE | 44 43 301 A1 | 6/1996 |
| EP | 1 923 135 A1 | 5/2008 |
| EP | 1918016 A1 | 5/2008 |
| JP | 2009 090273 | 4/2009 |
| WO | WO 96/27428 A1 | 9/1996 |
| WO | WO 2004/108264 A2 | 12/2004 |

OTHER PUBLICATIONS

Bosch, et al., 1988, "Formation and Control of Nitrogen Oxides," *Catalysis Today*, 2: 369-379.
Brandenberger, S., et al., 2008, "The State of the Art in Selective Catalytic Reduction of NOx by Ammonia Using Metal-Exchanged Zeolite Catalysts," *Catalysis Reviews: Science and Engineering*, 50: 492-531.
Busca, G., et al., 1998, "Chemical and Mechanistic Aspects of the Selective Catalytic Reduction of NOx by Ammonia over Oxide Catalysts: A Review," *Applied Catalysis B: Environmental* 18: 1-36.
Chen, J.P., et al., 1990, "Mechanism of Poisoning of the V2O5/TiO2 Catalyst for the Reduction of NO by NH3." *Journal of Catalysis*, 125: 411-420.
Due-Hansen, J., et al., 2007, "Vanadia-based SCR Catalysts Supported on Tungstated and Sufated Zirconia: Influence of Doping with Potassium," *Journal of Catalysis*, 251: 459-473.
Forzatti, P., et al. 1995, "Recent Advances in De-NOxing Catalysis for Stationary Applications," *HCR Comprehensive Review*, 3: 33-51.
Zheng, Y., et al., 2004, "Laboratory Investigation of Selective Catalytic Reduction Catalysts: Deactivation by Potassium Compounds and Catalyst Regeneration," *Ind. Eng. Chem. Res.*, 43: 941-947.

* cited by examiner

*Primary Examiner* — Timothy Vanoy
(74) *Attorney, Agent, or Firm* — Knobbe Martens Olson & Bear, LLP

(57) ABSTRACT

The present invention concerns the selective removal of nitrogen oxides (NOx) from gases. In particular, the invention concerns a process, a highly alkali metal resistant heteropoly acid promoted catalyst and the use of said catalyst for removal of NOx from exhaust or flue gases, said gases comprising alkali or earth alkali metals. Such gases comprise for example flue gases arising from the burning of biomass, combined biomass and fossil fuel, and from waste incineration units. The process comprises the selective catalytic reduction (SCR) of NOx, such as nitrogen dioxide ($NO_2$) and nitrogen oxide (NO) with ammonia ($NH_3$) or a nitrogen containing compound selected from ammonium salts, urea or a urea derivative or a solution thereof as reductant.

25 Claims, 17 Drawing Sheets

A

B

HETEROPOLY ACID PROMOTED CATALYST FOR SCR OF NOX WITH AMMONIA

RELATED APPLICATIONS

This application is U.S. National Phase of International Application PCT/EP2011/064793, filed Aug. 29, 2011 designating the U.S., and published in English as WO 2012/028566 on Mar. 8, 2012, which claims priority to U.S. Provisional Application No. 61/380,025 filed Sep. 3, 2010 and European Application No. 10009178.4 filed Sep. 3, 2012.

FIELD OF THE INVENTION

The present invention concerns the selective removal of nitrogen oxides (NOx) from gases. In particular, the invention concerns a process, a highly alkali metal resistant heteropoly acid promoted catalyst and the use of said catalyst for removal of NOx from exhaust or flue gases, said gases comprising alkali or earth alkali metals. Such gases comprise for example flue gases arising from the burning of biomass, combined biomass and fossil fuel, and from waste incineration units. The process comprises the selective catalytic reduction (SCR) of NOx, such as nitrogen dioxide ($NO_2$) and nitrogen oxide (NO) with ammonia ($NH_3$) or a nitrogen containing compound selected from ammonium salts, urea or a urea derivative or a solution thereof as reductant.

BACKGROUND OF THE INVENTION

Generally, nitrogen oxides are generated from stationary sources such as e.g. industrial boilers, gas turbines, steam power plants, waste incinerators, marine engines, and petrochemical plants. The selective catalytic reduction (SCR) is considered a useful approach for removing nitrogen oxides generated from stationary sources in view of economic and technological efficiency. A wide number of catalysts have been reported for the effective removal of nitric oxide by using ammonia as the reducing agent. All the catalysts can broadly be classified into three types namely noble metals, metal oxides and zeolites. Noble metals are very active for the reduction of NOx, but do not reduce selectively to $N_2$ because of ammonia oxidation. Side products like $N_2O$ might also be formed. Accordingly, noble metal catalysts have been replaced by metal oxide catalysts for conventional SCR and by zeolites for high temperature SCR applications because of their thermal stability.

SCR may thus be deemed a well-proven technology as regards its application with conventional, non-renewable fuels. However, over the past two decades there has been an increasing interest globally in the utilization of non-conventional fuels like biomass for energy production. Biomass such as wood and straw are $CO_2$ neutral fuels which may help to reduce the greenhouse effect. According to the latest official estimate, Denmark has approximately 165 PJ (petajoule) of residual biomass resources including waste, of which only half are currently used. Residual resources comprise straw, which is not needed for animal purposes, together with biogas from manure, organic waste and waste from wood industries. However, the potential of biomass fuels from a change of crops is huge. Denmark grows a lot of wheat which can be replaced by other crops such as corn, leading to a much higher biomass production while still maintaining the same output for food. Such reorganisation of the farming areas together with a few other options may lead to a total biomass fuel potential as high as 400 PJ.

In the EU, so far two binding directives have been enacted which set quantitative targets for renewable energies and fuels in the current and future energy supply up to 2010. In Directive 2001/77/EC on the promotion of electricity produced from renewable energy sources in the internal electricity market (2001) and Directive 2003/30/EC on the promotion of the use of biofuels or other renewable fuels for transport (2003), the target for renewable electricity is set to 22%, the target for biofuels set to 5.75%, and the target for total renewable energy consumption is set to 12%. Until 2020, these targets are to be enlarged considerably according to *EU Renewable Energy Road Map—Renewable energies in the 21$^{st}$ century: building a more sustainable future* (2007). Given that nearly 66% of renewable energy production in the EU in 2004 was based on biomass (hereafter referred to as bioenergy), the demand for biomass will increase rapidly during this time horizon.

The same trend is observed in the US, where biomass sources provide a small, but growing percentage of all energy consumed. In 2002, biomass supplied about 47 percent of all renewable energy consumed in the United States. Electricity generation from biomass (excluding municipal solid waste) represented about 11 percent of all generation from renewable sources in the United States. In fact, biomass supplied more energy to the US in 2002 than any other form of renewable energy, including hydroelectric power. Biomass supplied almost six times the energy of geothermal, solar and wind energy sources combined. Globally, biomass meets about 14 percent of the world's energy needs.

Thus, the worldwide use of biomass for production of energy is expected to keep an ascendant trend despite of its rather low caloric value.

The main pollutants resulting from biofuels are nitrogen, chlorine, potassium and silicon, the main emission being NOx, which may be reduced significantly by applying SCR technology. However, even though SCR is a well-proven technology, its application with non-conventional fuels like biomass brings about specific challenges. In particular, deactivation of the catalyst by biomass containing alkali metals and subsequent activity reduction is problematic. Flue gases stemming from the incineration of biomass fuel typically contain about 200-1000 mg KCl/Nm$^3$ whereas incineration of coal only leads to ppm levels of KCl.

Heteropoly acids (HPAs) and salts thereof are a class of compounds that have attracted much scientific interest. Because of their unique structure and the resulting acidic and redox properties, they have been studies as possible catalysts for a variety of reactions. HPAs possess unique physicochemical properties, with their structural mobility and multifunctionality being the most important for catalysis. Consequently, acid catalysis and selective oxidation are the major areas of catalytic applications of HPAs.

The class of HPAs can in broad general terms be described a compound containing 1) an addenda metal such as tungsten, molybdenum or vanadium, 2) oxygen, 3) a hetero atom being an element generally from the p-block of the periodic table, such as silicon, phosphorus or arsenic, and 4) acidic hydrogen atoms. The hetero atom(s) are situated in the center of the HPA structure with clusters formed by the addenda metals and the oxygen atoms situated around the centrally placed hetero atom(s).

The best known structural groups of HPAs is the Keggin structure ($H_nXM_{12}O_{40}$) and the Dawson structure ($H_nX_2M_{18}O_{62}$), wherein M denotes the addenda atoms and X is the hetero atom(s). The Keggin and Dawson structures exist in different isomers and may contain more than one type of metal addenda atoms. Thus, there exist in a large variety of possible HPAs. An example of Keggin and Dawson structure are shown in FIG. 14.

The majority of catalytic applications use the most stable and easily available Keggin HPAs, especially for acid catalysis. Most typical Keggin HPAs such as $H_3PW_{12}O_{40}$ (TPA), $H_4SiW_{12}O_{40}$ (TSiA) and $H_3PMo_{12}O_{40}$ (MPA) are commercially available. HPAs possess stronger (Brønsted) acidity than conventional solid acid catalysts such as acidic oxides and zeolites. The acid strength of Keggin HPAs decreases in the order: $H_3PW_{12}O_{40} > H_4SiW_{12}O_{40} > H_3PMo_{12}O_{40} > H_4SiMo_{12}O_{40}$. The acid sites in HPA are more uniform and easier to control than those in other solid acid catalysts. Usually, tungsten containing HPAs are the catalysts of choice because of their stronger acidity, higher thermal stability and lower oxidation potential compared to molybdenum acids.

It has previously been found that the 12-tungstophosphoric acid $H_3PW_{12}O_{40}$ (TPA) can effectively absorb NO at the flue gas temperatures, and that upon rapid heating, the absorbed NO is effectively decomposed into $N_2$. The results showed that the quantity of $NO_2$ retained on TPA is strongly dependent on temperature: increasing from 298 K reaches a maximum in the range from 423 to 573 K, and decreases to small values from 773 to 873 K. The results further showed that the quantities of $NO_2$ lost from the gas phase follow the order $H_3PW_{12}O_{40} > H_4SiW_{12}O_{40} > H_3PMo_{12}O_{40}$. Supplementary experiments showed that the maximum quantity of NO taken up by the solid is approximately equal to those of $NO_2$. The adsorption of NO occurs via replacement with the structural water present between the Keggin units in heteropoly acids. NOx adsorption/desorption capacities of TPA were measured under representative exhaust lean gas mixture conditions with a real car exhaust mixture containing, for example, $CO_2$, $H_2O$ and hydrocarbons. The results proposed a mechanism of both NOx absorption and desorption on TPA.

Later Pt/TPA and TPA supported metal oxides were also used extensively for the abatement of NOx majorly, for the mobile applications. Recently, Pd was loaded on the dispersed $H_3PW_{12}O_{40}$ (TPA) over a $SiO_2$ surface, and the catalyst was applied to the selective reduction of NO with aromatic hydrocarbons for the stationary applications. The catalyst exhibited high activity in the NO reduction when branched aromatic hydrocarbons, such as toluene and xylene were used as reductants.

The deactivation effect of alkaline metals on the activity of $V_2O_5/TiO_2$ catalysts for the biomass fired applications in power plants has been well reported in the literature. Most of these reports conclude that poisonous additives (e.g. potassium, barium) are affecting the Brønsted acid sites, which are responsible for the ammonia adsorption, thus decreasing both their number and activity in NO reduction. One of the possible ways to increase catalyst resistance to alkaline poisons is the use of supports, revealing high or super-acidic properties which would interact stronger with alkali than vanadium species. One such super-acidic characteristics are available in heteropoly acids also.

Heteropoly acids are typical strong Brønsted acids and catalyze a wide variety of reactions in both homogeneous and heterogeneous phases offering efficient and cleaner processes. For practical applications, it is important to improve the physical properties of HPA, e.g. by improving the mechanic and thermal resistance. This could be reached by depositing HPA on a suitable support while preserving its chemical properties (absorption capacity). Dispersing HPA on solid supports is important for catalytic application because the specific surface of unsupported HPA are usually low, although interstitial voids are created by the terminal oxygen atoms linking the hydrated protons because these are not interconnected the resulting solid acid have low BET ($N_2$) surface areas 1-10 $m^2\,g^{-1}$.

In general, HPA strongly interact with supports at low loading levels, while the bulk properties of HPA prevail at high loading levels. To overcome these disadvantages the HPA are usually supported on a suitable carrier that not only increases the available surface area but also improves the catalytic performance. The selection of proper support material has to take into account the strong acidity of HPAs. If a support is moderate to strongly basic (e.g., $Al_2O_3$, MgO), the interaction with HPA is too strong and leads to an acid-base reaction with loss of crystallinity of HPA with a complete degradation of its storage properties. If the support is strongly acidic (e.g., $SiO_2$), X-ray diffraction (XRD) structure of HPA exists, but the anchorage is not secured. In the case of medium acidity (e.g., $ZrO_2$, $TiO_2$ and $SnO_2$), the structural properties are retained and the activity remains high. Consequently, oxides supports can be selected from their isoelectric point (around 7).

To the best of our knowledge, the use of HPA's as a promoter in the selective catalytic reduction of NOx in exhaust or flue gases obtained from burning biomass is not disclosed anywhere in the literature. Also, the problem of alkali metals being present in exhaust gases released on burning biomass, which will normally lead to fast and irreversible poisoning of standard commercial SCR deNOx catalysts it not discussed in the literature.

There is consequently still a need for developing SCR catalysts which may function well under the specific and very demanding conditions of biomass incineration, and at the same time be sufficiently robust to allow for uninterrupted performance over long time periods.

SUMMARY OF THE INVENTION

In the present work, the promotional effect and alkali resistance of HPA-supported $TiO_2$ or $ZrO_2$ with $V_2O_5$ as the active material on the activity of the SCR reaction with ammonia as a reducing agent was studied. The influence of potassium oxide additives on the activity of the SCR reaction was also studied and compared with traditional $V_2O_5/TiO_2$ SCR catalysts.

Further, the promotional effect and alkali resistance of HPA-supported $TiO_2$ with Cu or Fe as the active material on the activity of the SCR reaction with ammonia as a reducing agent was studied. The influence of potassium oxide additives on the activity of the SCR reaction was also studied and compared with unpromoted $Cu-TiO_2$ and $Fe-TiO_2$ SCR catalysts. All the catalysts were characterized by various techniques to allow detailed discussion of the compositional effects on the SCR performance.

The first aspect of the present invention concerns the use of a heteropoly acid (HPA) promoted catalyst in the selective removal of nitrogen oxides from gases containing a significant amount of alkali metal and/or alkali earth compounds, which catalyst comprises:
  a support material having an isoelectric point around 7,
  a catalytic active metal compound, and
  HPA as a promoter
which removal takes place in the presence of a nitrogen containing compound selected from ammonia, ammonium salts, urea or a urea derivative or a solution thereof.

The second aspect of the invention concerns a method for providing a heteropoly acid promoted catalyst, comprising the steps of:

suspending dried support material in aqueous solution of the HPA of choice, drying the suspension mixture at about 120° C. for about 12 hours, wet impregnating the suspension mixture with a metal compound, drying the impregnated catalyst at about 120° C. for about 12 hours followed by calcination at 400-600° C. for about 4 hours.

The third aspect of the invention concerns a process for the selective removal of nitrogen oxides with a nitrogen containing compound selected from ammonia, ammonium salts, urea or a urea derivative or a solution thereof from gases resulting from the burning of biomass, combined biomass-fossil fuel, or emerging from stationary waste incineration units, which process comprises using a catalyst obtainable by the method of the second aspect of the invention.

BRIEF DESCRIPTION OF THE FIGURES

(FIG. 5a) and TPATi, MPATi and TSiATi catalysts calcined at 400° C. (FIG. 5b). The reaction conditions are 1000 ppm NO, 1100 ppm $NH_3$, 3.5% $O_2$, 2.3% $H_2O$, and balance $N_2$.

DETAILED DESCRIPTION OF THE INVENTION

Figure 1A:
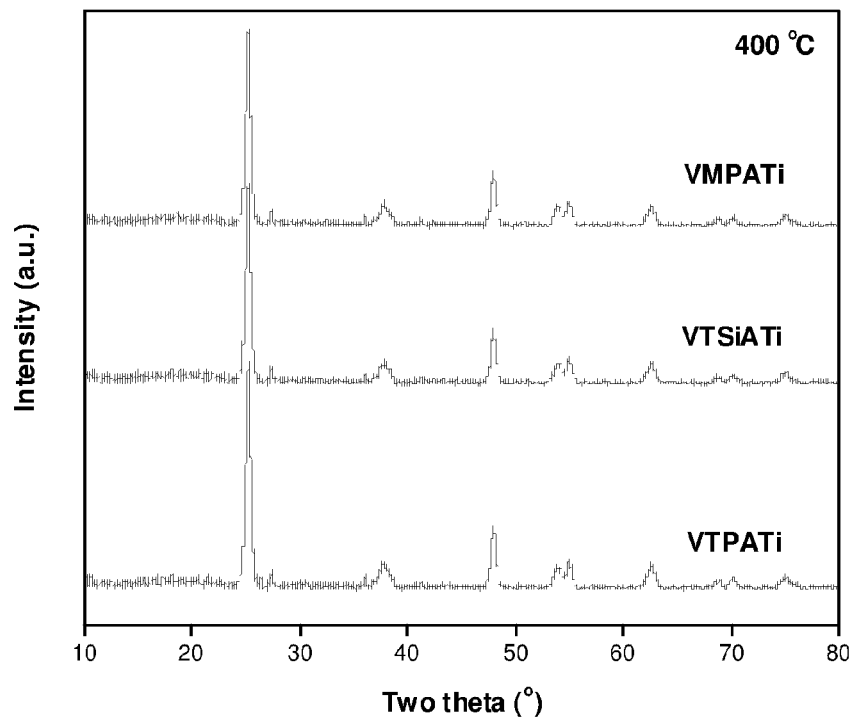
FIGS. 1a-c show X-ray powder diffraction (XRPD) patterns of fresh $V_2O_5$/TPA-TiO$_2$ (VTPATi) (FIG. 1a), $V_2O_5$/MPA-TiO$_2$ (VMPATi) (FIG. 1b), and $V_2O_5$/TSiA-TiO$_2$ (VTSiATi) (FIG. 1c) catalysts at various calcination temperatures and FIG. 1d show XRPD patterns of deactivated VTPATi (KVTPATi), deactivated VMPATi (KVMPATi), and deactivated VTSiATi (KVTSiATi) calcined at 400° C.

The first aspect of the present invention concerns the use of a heteropoly acid (HPA) promoted catalyst in the selective removal of nitrogen oxides from gases containing a significant amount of alkali metal and/or alkali earth compounds, which catalyst comprises:

a support material having an isoelectric point around 7, a catalytic active metal compound, and HPA as a promoter which removal takes place in the presence of a nitrogen containing compound selected from ammonia, ammonium salts, urea or a urea derivative or a solution thereof.

In one embodiment of the invention according to the first aspect said solution is an aqueous solution.

The acid sites in HPA are more uniform and easier to control than those in other solid acid catalysts. HPAs possess stronger (Brønsted) acidity than conventional solid acid catalysts such as acidic oxides and zeolites. Most typical Keggin HPAs such as $H_3PW_{12}O_{40}$ (TPA), $H_4SiW_{12}O_{40}$ (TSiA) and $H_3PMo_{12}O_{40}$ (MPA) are commercially available and stable. The acid strength of Keggin HPAs decreases in the order: $H_3PW_{12}O_{40} > H_4SiW_{12}O_{40} > H_3PMo_{12}O_{40} > H_4SiMo_{12}O_{40}$. Usually, tungsten HPAs are the catalysts of choice because of their stronger acidity, higher thermal stability and lower oxidation potential compared to molybdenum acids. Being stronger acids, HPAs are generally more active catalysts than the conventional solid acid catalysts, which allow efficient operation under milder conditions.

Dispersing HPA on solid supports is important for catalytic application because the specific surface of unsupported HPA is usually low. HPAs are usually supported on a suitable carrier that not only increases the available surface area but also improves the catalytic performance. The selection of proper support material has to take into account the strong acidity of HPAs. If a support is moderate to strongly basic (e.g., $Al_2O_3$, MgO), the interaction with HPA is too strong and leads to an acid-base reaction with loss of crystallinity of HPA with a complete degradation of its storage properties. If the support is strongly acidic (e.g., $SiO_2$), XRD structure of HPA exists, but the anchorage is not secured. In the case of medium acidity (e.g., $ZrO_2$, $TiO_2$ and $SnO_2$), the structural properties are retained and the activity remains high. Consequently, oxides supports can be selected from their isoelectric point (around 7).

From those results, and in order to improve the performance of the simple titanium and zirconium oxides, $TiO_2$ and $ZrO_2$ materials are preferably chosen as support for HPA in the present invention.

In an embodiment of the first aspect of the invention the support material is $TiO_2$.

In an embodiment of the first aspect of the invention the support material is $ZrO_2$.

In an embodiment of the first aspect of the invention, the HPA is a Keggin type structure HPA.

In an embodiment of the first aspect of the invention, the HPA is TPA.

In an embodiment of the first aspect of the invention, the HPA is TSiA.

In an embodiment of the first aspect of the invention, the HPA is MPA.

In an embodiment of the first aspect of the invention, the HPA can be a mixture of TPA and/or TSiA and/or MPA.

In a further embodiment of the first aspect of the invention, the catalytic active metal compound is a vanadium compound. $V_2O_5$ is traditionally used as the active material in SCR reactions.

In an embodiment of the first aspect of the invention the catalytic active metal compound is vanadium and the support material is $TiO_2$.

In an embodiment of the first aspect of the invention the catalytic active metal compound is vanadium and the support material is $ZrO_2$.

Over all, VMPA, VTPA and VTSiA catalysts showed maximum rate constant ($k_{max}$) values of 803, 966 and 963 $cm^3/g\cdot s$ respectively at their optimum conditions. The rate constant values are much higher than the commercial $V_2O_5$—$WO_3$/$TiO_2$ catalyst and highly active $V_2O_5$/Sulphated-$ZrO_2$ catalysts (430 $cm^3/g\cdot s$). This comparison with the mass based rate constant gives a clear idea about the HPAs ability to enhance the SCR reaction.

In another further embodiment of the first aspect of the invention, the catalytic active metal compound is a copper compound.

In another further embodiment of the first aspect of the invention, the catalytic active metal compound is an iron compound.

Copper (Cu) and iron (Fe) metal catalysts are potential alternatives to the toxic vanadium-based systems. The Cu-HPA and Fe-HPA promoted catalysts showed better deactivation resistance as compared to that of the two unpromoted Cu and Fe catalysts. Unpromoted Cu—$TiO_2$ and Fe—$TiO_2$ were severely deactivated upon potassium addition while the corresponding HPA promoted catalysts showed appreciable potassium resistance. The order of the Cu catalysts in term of relative remaining activity after potassium doping were: Cu-TPA>Cu-MPA>Cu-TSiA>Cu and that of Fe catalysts were: Fe-TSiA>Fe-TPA>FeMPA>Fe. These orders of alkali resistivity were found to correlate well with the relative surface acidity of the catalysts. Consequently, the potassium deactivation was also significantly less in the promoted Cu and Fe catalysts compared to that of traditional SCR catalysts.

An embodiment the invention also provides the use of a catalyst of the invention which comprises 0.5-5%; 1-4%, 2-3.5% or around 3% w/w of the catalytic active metal compound. In a preferred embodiment the invention provides the use of a catalyst of the invention which comprises around 3% w/w of the catalytic active metal compound.

An embodiment the invention also provides the use of a catalyst comprising 5-30% w/w of the support material.

The support is in a particularly preferred embodiment impregnated with a vanadium compound to achieve a final loading of 3% w/w $V_2O_5$ after calcination. The support is in a particularly preferred embodiment impregnated with a copper compound to achieve a final loading of 3% w/w Cu after calcination. The support is in a particularly preferred embodiment impregnated with an iron compound to achieve a final loading of 3% w/w Fe after calcination. Ammonia is commonly used for the reduction of nitrogen oxides to nitrogen and water by the heteropoly acid catalysts of the invention, but solid "ammonia-like" materials like ammonium salts, urea and urea derivatives which may be converted to ammonia under the reaction conditions for the selective removal of nitrogen oxides from gases, may be economically viable and less hazardous alternatives to ammonia. Also solutions (e.g. aqueous solutions) of ammonia, ammonium salts, urea and urea derivatives can be used for the selective removal of nitrogen oxides from gases. Thus, in one embodiment of the invention the selective removal of nitrogen oxides takes place in the presence of an ammonium salt. In another embodiment the selective removal of nitrogen oxides takes place in the presence of urea or a urea derivative. In a preferred embodiment the selective removal of nitrogen oxides takes place in the presence of ammonia.

The catalysts of the present invention display a useful activity over a very wide temperature range. Thus, in one embodiment, the selective removal of nitrogen oxides takes place at a temperature between 350 and 540° C. In a preferred embodiment the selective removal of nitrogen oxides takes place between 400 and 500° C., where the catalysts of the present invention have their highest activity. For the VMPA catalysts $k_{max}$ values are observed at 440° C. and for VTPA and VTSiA catalysts $k_{max}$ values at 460° C. are observed. For the Cu-MPA, Cu-TSiA and Cu-TPA catalysts $k_{max}$ values are observed at about 400° C. and for Fe-MPA catalysts $k_{max}$ values are observed at about 420° C. whereas for Fe-TSiA and Fe-TPA catalysts $k_{max}$ values at about 470° C. are observed.

In a specific embodiment the SCR catalyst is impregnated with potassium to achieve a final loading of about 100 µmol K (as potassium oxide, $K_2O$) per gr. catalyst after calcination.

Doping the optimum catalysts with potassium (K\V molar ratio=0.3 or 100 µmol/g) resulted in a decrease in activity and a small shift of $k_{max}$ towards lower temperature (FIGS. 6a-d). A possible explanation for such a temperature shift is that the potassium loading reduced the activity of the main NO-SCR reaction while the rate of the side reaction of ammonia oxidation remained constant or even increased.

All the potassium doped HPA catalysts showed similar profiles as that of undoped catalysts. KVMPA catalyst showed $k_{max}$ value at 400° C. and VTPA and VTSiA catalysts showed $k_{max}$ at 440° C. Especially the decrease in $k_{max}$ from 500 to 155 $cm^3/g\cdot s$ of the VT catalyst implies the severe poisoning effect of alkali in the absence of HPAs. On VT catalyst—potassium seems to preferably coordinate with the vanadium sites and make them inactive for the SCR reaction.

Figure 7:
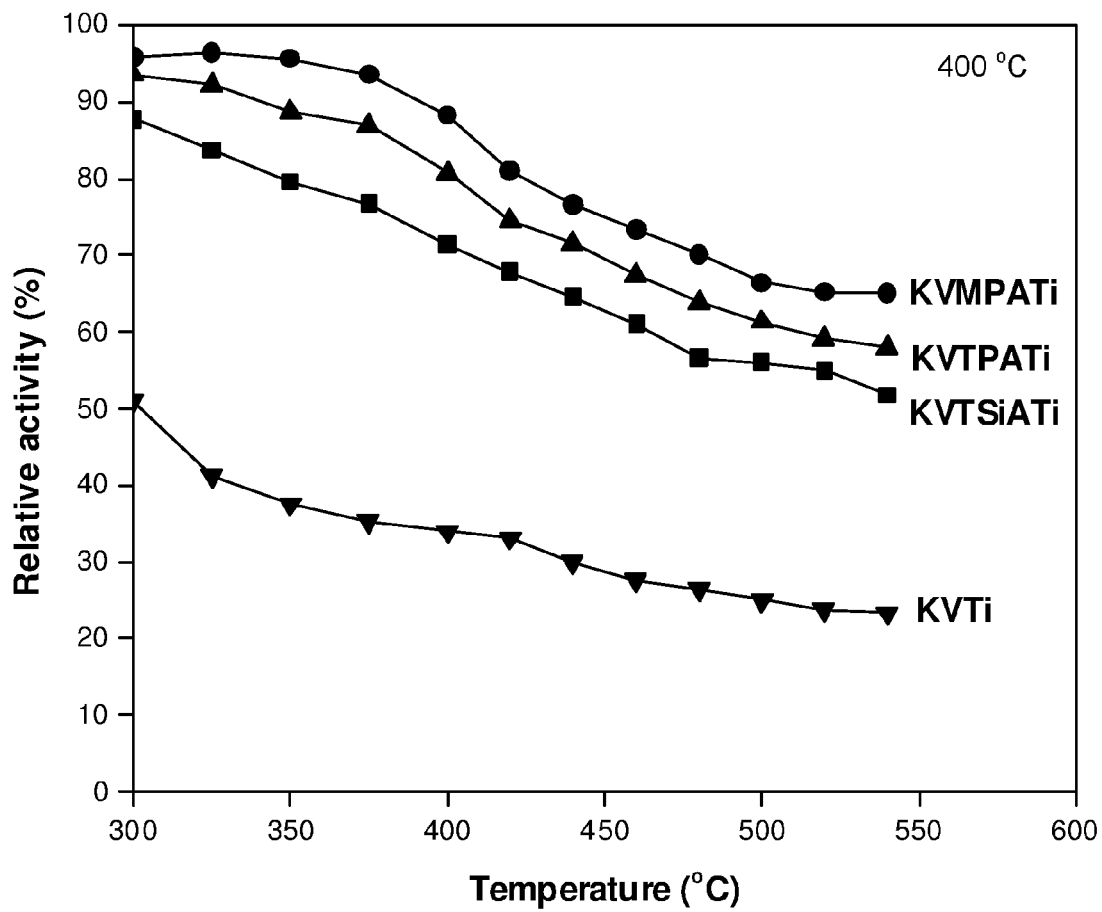
FIG. 7 shows the relative activity of KVTPATi, KVMPATi, and KVTSiATi and unpromoted KVTi catalysts ($V_2O_5$/TiO$_2$) calcined at 400° C.

HPA promoted catalysts showed better deactivation resistance as compared to that of VT catalyst (FIG. 7). VT catalysts showed a relative activity of 33% and that of VMPA, VTPA, VTSiA catalysts showed 88%, 81%, 71%, respectively at 400° C. For all catalysts the deactivation increases with reaction temperature which is connected with the shift of the maximum activity towards lower temperatures for potassium-poisoned catalysts. Especially, VMPA catalyst is very much resistive to alkali poisons as compared to other catalysts. This could be due to the low temperature performance of this catalyst as well as its moderate loss of acidity after potassium poisoning. Consequently, the potassium deactivation was significantly less in the present catalysts compared to that of traditional SCR catalysts. Highly active $V_2O_5$—$WO_x$/

$ZrO_2$ catalyst reported in literature for biomass fired applications showed 40% relative activity even with a less potassium concentration of only 80 µmol/g.

Thus, HPA-promoted $V_2O_5/TiO_2$ catalysts are promising catalysts for coal fired as well as biomass fired power plant SCR applications.

The second aspect of the invention concerns a method for providing a heteropoly promoted catalyst, comprising the steps of:
- suspending dried support material in aqueous solution of the HPA of choice,
- drying the suspension mixture at about 120° C. for about 12 hours, creating a support,
- wet impregnating the support with a metal compound,
- drying the impregnated catalyst at about 120° C. for about 12 hours followed by calcination at 400-600° C. for about 4 hours.

In an embodiment of the second aspect of the invention, the support material is $TiO_2$.

In an embodiment of the second aspect of the invention, the support material is $ZrO_2$.

In an embodiment of the second aspect of the invention, the HPA is a Keggin structure HPA.

In an embodiment of the second aspect of the invention, the HPA is TPA.

In an embodiment of the second aspect of the invention, the HPA is TSiA.

In an embodiment of the second aspect of the invention, the HPA is MPA.

In an embodiment of the second aspect of the invention, the HPA can be a mixture of TPA and/or TSiA and/or MPA.

In a further embodiment of the second aspect of the invention, the metal compound is a vanadium compound.

In another further embodiment of the second aspect of the invention, the metal compound is a copper compound.

In another further embodiment of the second aspect of the invention, the metal compound is an iron compound.

The support is preferably impregnated with the metal compound to achieve a final loading of 0.5-5%; 1-4%, 2-3.5% or around 3% w/w of the catalytic active metal compound after calcination.

The support is impregnated with the HPA compound to achieve a final loading of 5-30%; 10-20%, or around 15% w/w of the support material after calcination.

The impregnation is preferably carried out to achieve a final loading of 3% w/w of the catalytic active metal compound after calcination.

The impregnation is in a particularly embodiment preferably carried out with a vanadium compound to achieve a final loading of 3% w/w of $V_2O_5$ after calcination.

The impregnation is in a particularly embodiment preferably carried out with a copper compound to achieve a final loading of 3% w/w of Cu after calcination.

The impregnation is in a particularly embodiment preferably carried out with an iron compound to achieve a final loading of 3% w/w of Fe after calcination.

The vanadium compound is conveniently chosen from ammonium vanadate, vanadium oxalate or another aqueously soluble vanadium compound known to the skilled person.

The copper compound is conveniently copper nitrate or another aqueously soluble copper compound known to the skilled person.

The iron compound is conveniently iron nitrate or another aqueously soluble iron compound known to the skilled person.

In a specific embodiment of the second aspect of the invention, the method further comprise the step of impregnating the SCR catalyst with potassium to achieve a final loading of about 100 µmol K (as potassium oxide, $K_2O$) per gr. catalyst after calcination.

It was found that the heteropoly acid catalysts obtained by the method of the second aspect of the present invention show high poisoning resistivity after doping with potassium oxide (100 µmol/g) and therefore are capable of maintaining a high catalytic activity even when exposed to gases containing significant amounts of alkali metal and/or alkali earth compounds. The poisoning resistance is believed to be due to a unique combination of high surface area, acidity and structure of the HPAs.

In a specific embodiment the invention provides a catalyst which is obtainable by the method of the second aspect of the present invention.

In a preferred embodiment of the invention, the heteropoly acid catalysts obtained by the method of the second aspect of the present invention have a large surface area and a high total acidity.

The third aspect of the invention concerns a process for the selective removal of nitrogen oxides with a nitrogen containing compound selected from ammonia, ammonium salts, urea or a urea derivative or a solution thereof from gases resulting from the burning of biomass, combined biomass-fossil fuel, or emerging from stationary waste incineration units, which process comprises using a catalyst obtainable by the method of the second aspect of the invention.

In a further embodiment, the invention concerns a process for the selective removal of nitrogen oxides with a nitrogen containing compound selected from ammonia, ammonium salts, urea or a urea derivative or a solution thereof from gases resulting from the burning of biomass, combined biomass-fossil fuel, or emerging from stationary waste incineration units, which gases contain significant amounts of moisture, typically between 2-20% $H_2O$ or between 10-15% $H_2O$, which process comprises using a catalyst obtainable by the method of the second aspect of the invention.

In a further embodiment, the invention concerns a process for the selective removal of nitrogen oxides with a nitrogen containing compound selected from ammonia, ammonium salts, urea or a urea derivative or a solution thereof from gases resulting from the burning of biomass, combined biomass-fossil fuel, or emerging from stationary waste incineration units, which gases contain significant amounts of alkali metal and/or alkali earth compounds, such as, for example, up to several hundred mg potassium per $m^3$ gas, which process comprises using a catalyst obtainable by the method of the second aspect of the invention.

In one embodiment of the invention according to the third aspect said solution of ammonia, ammonium salts, urea or a urea derivative is an aqueous solution.

According to one embodiment of the invention, the catalyst according to the invention is provided in a form that provides minimal resistance to the flue gases, such as minimal pressure loss, while still providing reliable catalytic conversion of NOx to $N_2$.

One embodiment of the invention concerns a process of selectively removing nitrogen oxides with ammonia from gases resulting from the burning of biomass, combined biomass-fossil fuel or emerging from waste incineration units at a temperature from about 200° C. to about 600° C., which process comprises using a catalyst obtainable by the method of the second aspect of the invention. In a preferred embodiment the temperature is around 400° C.

Commonly, for low temperature applications, such as placement of the catalyst unit in the flue gas duct after dust filtration in waste incineration plants, the temperature of the flue gas is in the range of 150-300° C. In the case of high temperature applications, such as placement of the catalyst unit at high dust positions in the flue gas duct, the temperature of the flue gas is often in the range of 340-420° C. For intermediate temperature applications, the temperature of the flue gas is in the area of about 250-370° C. The catalysts of the present invention can be placed at high dust positions in the flue gas duct due to their superior alkali metal poisoning resistivity, which allows them to catalyze the deNOx reaction with a much higher rate constant than if they were placed after a dust filter where the temperature is lower.

Commonly, one or more heat exchange units are provided in order to utilize the thermal energy of the flue gas. In one embodiment, the SCR process according to the invention takes place before a heat exchange unit. In a further embodiment, the SCR process is conducted after a heat exchange unit. In yet another embodiment, the SCR process takes place in between heat exchange units. In still another embodiment, heat controlling means are provided in order to control the temperature of the flue gas before and/or during the SCR. Thereby the efficiency of the SCR process can be controlled and/or optimized for the respective catalyst according to the invention, and its temperature profile with respect to catalytic activity. Such heat controlling means may comprise means to alter the rate of combustion, means to alter the flow of gas and the like. Generally, such means are well-known in the art.

Very often, fuels containing alkali metals as well as earth alkali will also contain significant amounts of alkali metals as well as earth alkali in the resulting flue gases upon incineration or burning. Fossil fuels, such as oil, natural gas and coal contain lower amounts of alkali metals and earth alkali metals. Waste, such as waste burned in waste incineration plants contains high levels of alkali metals as well as earth alkali metals. Biomass or biomass fuel such as straw, woodchips and wood pellets contain very high levels of alkali metals, especially K, as well as earth alkali metals. In the case of fly ash from burning straw, alkali metals and earth alkali metals can comprise as much as half of the total weight of the fly ash. Flue gases stemming from the incineration of biomass fuel typically contain about 200-1000 mg $KCl/Nm^3$, whereas incineration of coal only leads to ppm levels of KCl.

By the use of a catalyst according to the invention, the lifetime can be increased significantly compared to conventional, non-heteropoly acids catalysts. In one embodiment of the invention, the life time of the catalyst is increased by a factor of at least 1.5; 1.5-3.0; 3.0-5.0; 5.0-10; or 100, compared to a similar/comparable catalyst. In a further embodiment of the invention, the lifetime of the catalyst according to the invention is 2-5 times compared to a comparable catalyst. Apart from economical benefits, this also provides a greater flexibility with respect to exchange and/or cleaning of the catalyst. By a larger window of opportunity for when to close the plant for exchange, cleaning, or reactivation of the catalyst, sensitive time periods may be avoided. For many applications, a shut down during summer is less expensive than during winter.

A catalyst according to the present invention can be treated and handled using conventional methods and techniques in the field. The catalyst can also be cleaned/washed and recycled.

In the context of the present invention, the terms "around", "about", or "approximately" are used interchangeably and refer to the claimed value, and may include variations as large as +/−0.1%, +/−1%, or +/−10%. The terms "around", "about", or "approximately" may also reflect the degree of uncertainty and/or variation that is common and/or generally accepted in the art.

The present invention will be better understood after reading the following non-limiting examples.

Experimental

Catalyst Preparation and Characterization

The $TiO_2$ anatase-supported heteropoly acids $H_3PW_{12}O_{40}$ (TPA), $H_4SiW_{12}O_{40}$ (TSiA), and $H_3PMo_{12}O_{40}$ (MPA) were prepared by suspending a known amount of dried $TiO_2$ anatase powder in aqueous solution of corresponding heteropoly acids. The suspension mixture (optimum heteropoly acids loading, 15%) were dried at 120° C. for 12 h. 3 wt. % $V_2O_5$ modified catalysts were prepared by wet impregnation by dissolving the required amount of ammonium meta-vanadate (Aldrich, 99,999%) as a precursor in 2 M oxalic acid solution to the pure $TiO_2$ and $HPA-TiO_2$ supports.

3 wt. % Cu or Fe modified catalysts were prepared by wet impregnation by adding the required amount of copper nitrate or iron nitrate (Aldrich, 99,999%) solution to the pure $TiO_2$ or $HPA-TiO_2$ supports.

Similarly, the $ZrO_2$ supported heteropoly acids $H_3PW_{12}O_{40}$ (TPA), $H_4SiW_{12}O_{40}$ (TSiA), and $H_3PMo_{12}O_{40}$ (MPA) were prepared by suspending a known amount of dried $ZrO_2$ anatase powder in aqueous solution of corresponding heteropoly acids. The suspension mixture (optimum heteropoly acids loading, 15%) were dried at 120° C. for 12 h. 3 wt. % $V_2O_5$ modified catalysts were prepared by wet impregnation by dissolving the required amount of ammonium meta-vanadate (Aldrich, 99,999%) as a precursor in 2 M oxalic acid solution to the pure $ZrO_2$ and $HPA-ZrO_2$ supports.

The potassium-doped catalyst was prepared by co-impregnation with a solution of $KNO_3$ (Aldrich, 99.999%) to obtain a potassium loading of 100 μmol/g catalyst corresponding to a K/V molar ratio of 0.3. Each impregnated catalyst was oven dried at 120° C. for 12 h followed by calcination at 400-600° C. for 4 h prior to use.

X-ray powder diffraction (XRPD) measurements were performed on a Huber G670 powder diffractometer using Cu $K_α$ radiation within a 2θ range of 10-60° in steps of 0.02°. BET surface area of the sample was determined from nitrogen physisorption measurements on about 100 mg sample at liquid nitrogen temperature (77 K) with a Micromeritics ASAP 2010 instrument. The samples were heated to 200° C. for 1 h prior to measurement.

$NH_3$ temperature-programmed desorption ($NH_3$-TPD) experiments were conducted on a Micromeritics Autochem-II instrument. In a typical TPD experiment, about 100 mg of dried sample was placed in a quartz tube and pretreated in flowing He at 500° C. for 2 h. Then, the temperature was lowered to 100° C. and the sample was treated with anhydrous $NH_3$ gas (Air Liquide, 5% $NH_3$ in He). After $NH_3$ adsorption, the sample was flushed with He (50 ml/min) for 100 min at 100° C. Finally, the TPD operation was carried out by heating the sample from 100 to 700° C. (10° C./min) under a flow of He (25 ml/min).

Catalytic Activity Measurements

The SCR activity measurements were carried out at atmospheric pressure in a fixed-bed quartz reactor loaded with 20 mg of fractionized (180-300 μm) catalyst samples positioned between two layers of inert quartz wool. The reactant gas composition was adjusted to 1000 ppm NO, 1100 ppm $NH_3$, 3.5% $O_2$, 2.3% $H_2O$ and balance $N_2$ by mixing 1% $NO/N_2$ (±0.1% abs.), 1% $NH_3/N_2$ (0.005% abs.), $O_2$ (≥99.95%) and balance $N_2$ (≥99.999%) (Air Liquide) using Bronkhorst EL- Flow F-201C/D mass-flow controllers. The total flow rate was maintained at 300 ml/min (ambient conditions).

During the experiments the temperature was raised stepwise from 200 to 540° C. while the NO and $NH_3$ concentrations were continuously monitored by Thermo Electron's Model 10A chemiluminiscent $NH_3$—$NO_x$ gas analyzer. The catalytic activity is represented as the first-order rate constant $(cm^3/g \cdot s)$, since the SCR reaction is known to be first-order with respect to NO under stoichiometric $NH_3$ conditions. The first-order rate constants under plug flow conditions were obtained from the conversion of NO as:

$$k = -(F_{NO}/(m_{cat} \times C_{NO}))\ln(1-X)$$

where $F_{NO}$ denotes the molar feed rate of NO (mol/s), $m_{cat}$ the catalyst weight, $C_{NO}$ the NO concentration (mol/cm$^3$) in the inlet gas and X the fractional conversion of NO.

Results and Discussion

To understand the thermal stability of the catalysts it is very convenient to study the crystalline phase transformations of the materials. For pure titania ($TiO_2$) an amorphous behaviour was observed below 350° C. corresponding to that it consists of a mixture of anatase, brookite and rutile phases. When increasing the calcination temperature, the amount of the anatase phase increased and became predominant at 500° C. Upon heating at 700° C. the anatase phase of titania was completely transformed into the rutile phase. The XRD patterns of the catalysts with 15% TPA loading calcined at 700° C. show the role of TPA which strongly influences the crystallization of titanium hydroxide into titania and the development of new textural properties with temperature as compared to pure titania.

Figure 1B:
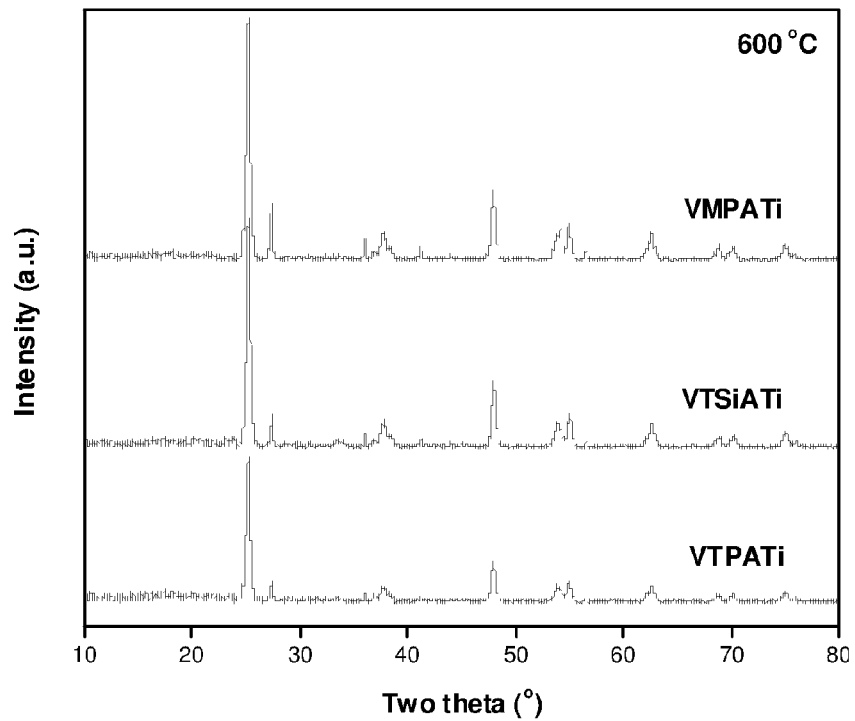
Figure 1C:
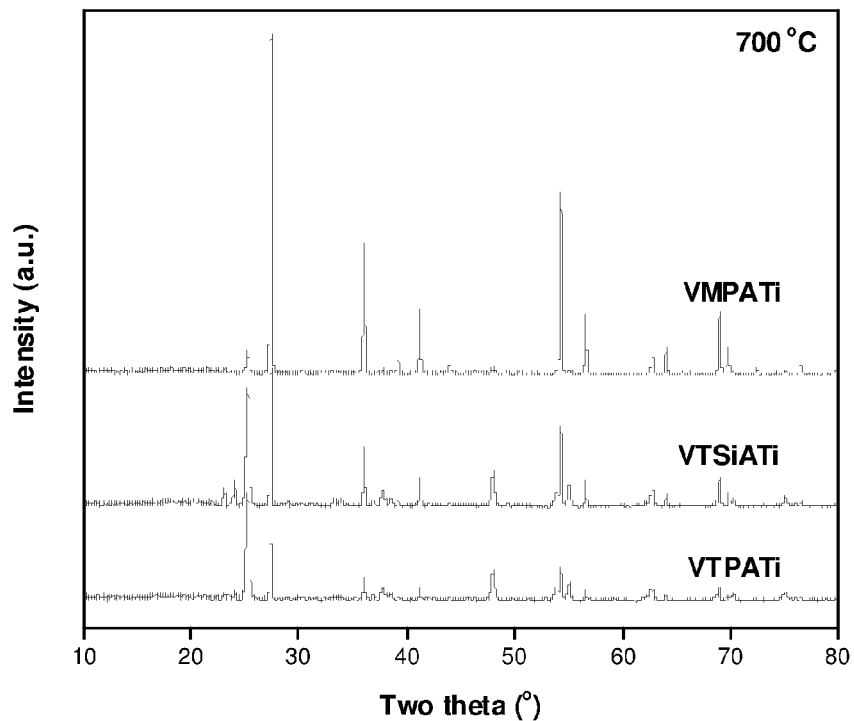

The X-ray powder diffraction (XRPD) patterns of VTPATi ($V_2O_5$/TPA-$TiO_2$), VMPATi ($V_2O_5$/MPA-$TiO_2$), and VTSiATi ($V_2O_5$/TSiA-$TiO_2$) samples calcined at various temperatures are showed in FIGS. 1a-c. At 400° C. no diffractions lines attributing to crystalline $V_2O_5$ or HPAs were observed—only support $TiO_2$ patterns can be observed indicating that the vanadium and HPAs are highly dispersed on the support. Both anatase (2θ=25.3°, 37.9°, 47.8° and) 54.3° and very small rutile (2θ=27.4°, 36.1°, and) 54.2° phases are present in the catalysts. Partial transformation to rutile can be seen at 600° C. and transformation into rutile rich phase happen at 700° C. The intensity of rutile phase is varying for each catalyst and they are in the order VMPATi>VTSiATi>VTPATi.

Figure 1D:
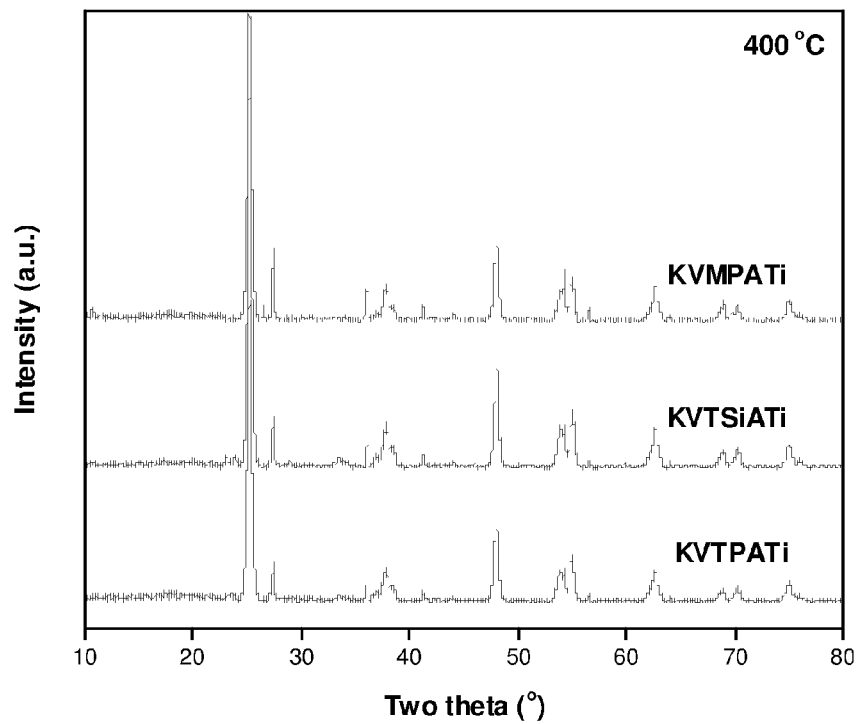

At 700° C. calcination temperature some decomposition products of HPAs ($MoO_3$ and $WO_3$) can be seen along with rutile rich phase support. Potassium doped catalysts (FIG. 1d) showed further increase in rutile phase and they are in the order KVMPATi>KVTSiATi>KVTPATi. This confirms that the presence of vanadium or potassium further accelerates the transformation of anatase to rutile phase with increasing the calcination temperature.

The results of the $N_2$-BET surface area are summarized in Table 2 and Table 3 for fresh and potassium deactivated catalysts calcined at 400° C.

TABLE 2

Surface area and $NH_3$—TPD results of fresh catalysts calcined at 400° C.

| Catalyst | Surface area (m$^2$/g) | Acidity (μmol/g) | $T_{max}1$ | $T_{max}2$ |
|---|---|---|---|---|
| VTi | 128 | 571 | — | — |
| VTPATi | 88 | 839 | 281 | 417 |
| VTSiATi | 96 | 809 | 265 | 401 |
| VMPATi | 90 | 787 | 256 | 350 |

TABLE 3

Surface area and $NH_3$—TPD results of potassium doped (K) catalysts calcined at 400° C.

| Catalyst | Surface area (m$^2$/g) | Acidity (μmol/g) | $T_{max}1$ | $T_{max}2$ |
|---|---|---|---|---|
| KVTi | 120 | 108 | — | — |
| KVTPATi | 80 | 503 | 178 | 338 |
| KVTSiATi | 90 | 463 | 194 | 344 |
| KVMPATi | 82 | 491 | 193 | 342 |

Surface area of VTi catalyst ($V_2O_5$—$TiO_2$) showed 128 m$^2$/g where that of HPA promoted catalysts showed small decrease. Potassium deactivated catalysts showed further decrease in surface area which might be due to pore blocking phenomena.

Temperature-programmed desorption (TPD) of ammonia or pyridine is a frequently used method for determining the surface acidity of solid catalysts as well as acid strength distribution. Ammonia is often applied as a probe molecule because of its small molecular size, stability and high basic strength (pKa=9.2). In the present investigation, the acidity measurements have been carried out by the $NH_3$-TPD method.

Total amount of adsorbed ammonia, which is determined from the area under the TPD curve, corresponds to molecular adsorbed ammonia on Lewis sites (around 200° C.) and ammonia adsorbed as ammonium ions on Brønsted acidic hydroxy groups (above 300° C.). Furthermore, in $NH_3$-TPD measurements, the temperature of the maximum ammonia desorption reflects the relative strength of the acid sites. Acid strength of the catalysts can be best described with their desorption temperatures. All the catalysts showed two ammonia desorption regions; one due to moderate acid strength (high $T_{max}2$ region) and the other due to weak acid strength (low $T_{max}1$ region). The $T_{max}1$ peak attributed to the weak acid sites was observed at around 200° C., while the $T_{max}2$ peak attributed to the strong acid sites was observed between 300-500° C.

Figure 2A:
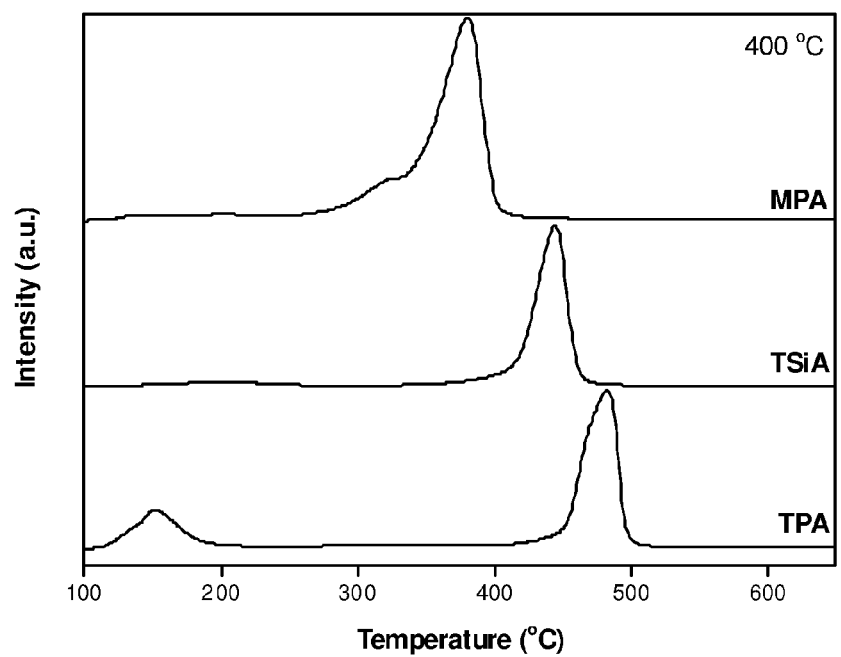
FIGS. 2a-b show $NH_3$ temperature programmed desorption ($NH_3$-TPD) profiles of pure HPA catalysts (FIG. 2a) and HPATi catalysts (FIG. 2b) calcined at 400° C.
Figure 2B:
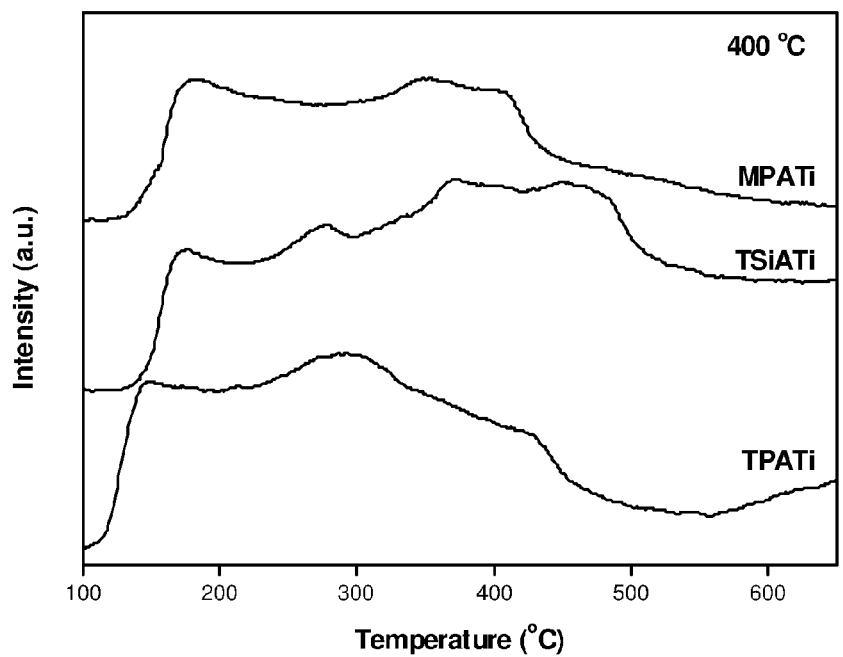

FIGS. 2a-b show the $NH_3$-TPD desorption patterns of pure HPAs (FIG. 2a) and HPATi (FIG. 2b) catalysts in the temperature range of 100-650° C. Pure HPAs showed sharp $NH_3$ desorption peak between 300-500° C., which indicate the acid sites are Brønsted acidic in nature and the order of acid strength based on desorption temperature is TPA>TSiA>MPA. Pure TPA, TSiA and MPA HPAs showed an acidity of 1642, 1322 and 2647 μmol/g, respectively. The acidity values indicate that these HPAs are super acidic in nature can be compared with that of zeolites and acidic oxides. Such a super acidic nature of HPAs is due to discrete and mobile ionic structure with tuneable chemical composition. $TiO_2$ supported HPAs calcined at 400° C. showed broad $NH_3$-desorption patterns could further indicate that the HPAs are evenly distributed on $TiO_2$ carrier. TPATi, TSiATi and MPATi catalysts showed an acidity of 788, 765 and 755 µmol/g, respectively.

Figure 3A:
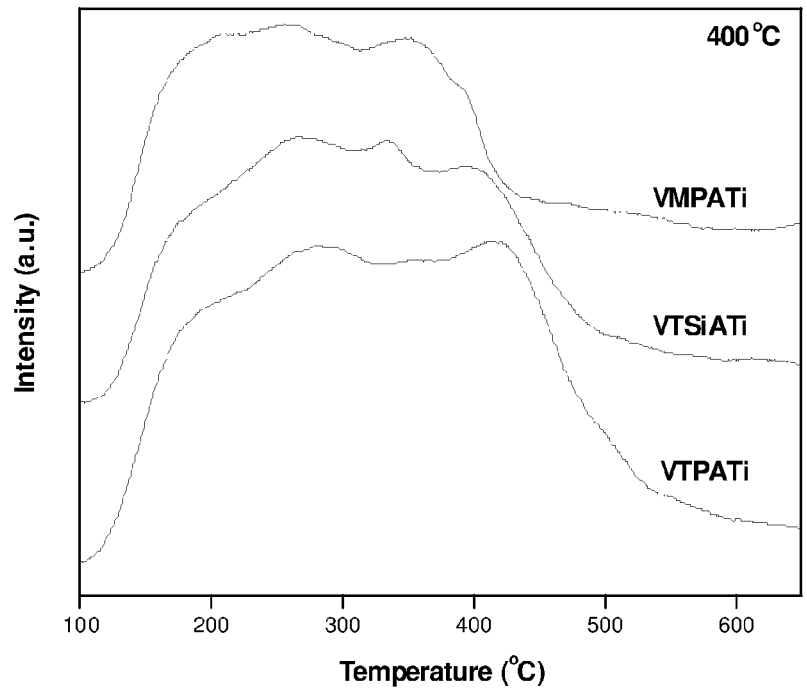
FIGS. 3a-b show $NH_3$-TPD profiles of fresh (FIG. 3a) and deactivated (FIG. 3b) VTPATi, VMPATi, and VTSiATi catalysts calcined at 400° C.
Figure 3B:
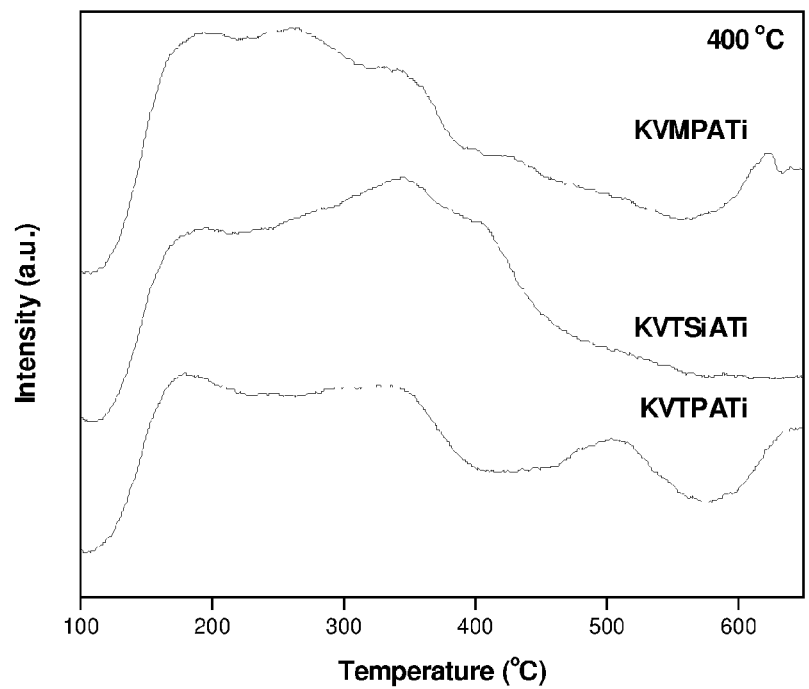

FIGS. 3a-b show $NH_3$-TPD profiles of fresh (FIG. 3a) and deactivated (FIG. 3b) VTPATi, VMPATi, and VTSiATi catalysts in the temperature range of 100-650° C. The results of the $NH_3$-TPD are summarized in Table 2 and Table 3.

TPA, TSiA and MPA promoted $TiO_2$ support showed an acidity value of 788, 765 and 755 µmol/g, respectively (not shown). The acidity of the pure VTi catalyst without promoters showed 571 µmol/g and that of VMPATi, VTPATi and VTSiATi impregnated catalysts showed increase in acidity with the presence of vanadium. It is known that acidity of the catalysts is enhanced with presence of vanadium on the support. Total acidity of the VHPATi catalysts is in the order of VTPATi>VTSiATi>VMPATi.

Acid strength of the catalysts can best be described with their desorption temperatures. All the catalysts showed two ammonia desorption regions; one due to moderate acid strength (high $T_{max}2$ region) and the other due to weak acid strength (low $T_{max}1$ region). The $T_{max}1$ peak attributed to the weak acid sites was observed at around 250° C., while the $T_{max}2$ peak attributed to the strong acid sites was observed around 400° C. The VTPATi catalyst revealed very large $T_{max}1$ and $T_{max}2$ peaks, indicating its high acid site density. Acid strength of the catalysts are in the order of VTPATi>VTSiATi>VMPATi.

The acid sites in HPA are more uniform and easier to control than those in other solid acid catalysts. Usually, tungsten HPAs are the catalysts of choice because of their stronger acidity, higher thermal stability and lower oxidation potential compared to molybdenum acids. Being stronger acids, HPAs are generally more active catalysts than the conventional solid acid catalysts, which allow efficient operation under milder conditions.

The results of the $NH_3$-TPD for potassium deactivated catalysts are summarized in Table 3. Overall there is a drastic decrease in acidity and $T_{max}$ peak positions. It is rather obvious to assume that potassium oxide first occupy the strongest acid sites and then due to electron donation weakens the remaining acid sites, and therefore is $T_{max}$ in potassium deactivated catalysts shifted towards lower temperature regions. Especially KVTi catalyst acidity dropped (81%) from 571 to 108 µmol/g and those of KVTPATi (40%), KVTSiATi (43%) and KVMPATi (38%) catalysts showed less drop in acidity after deactivation.

Figure 4:
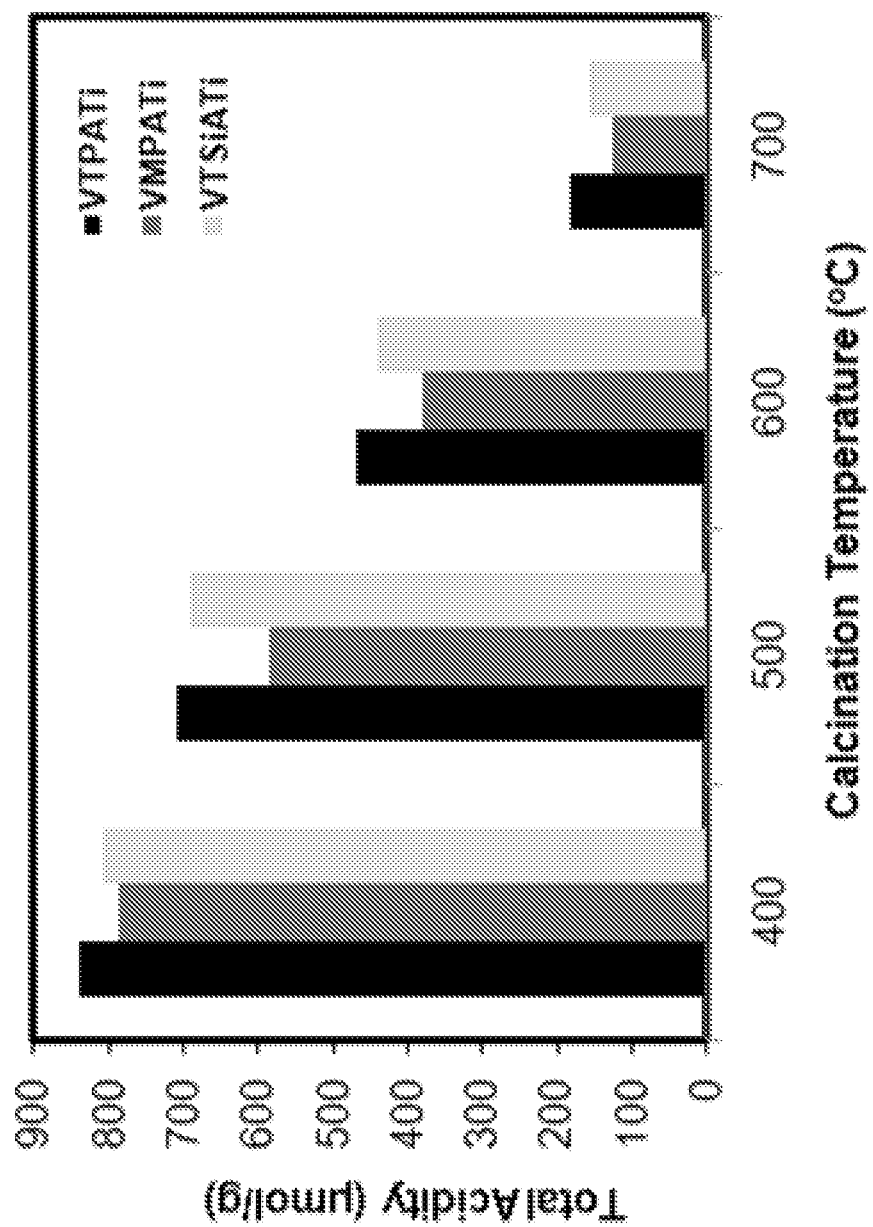
FIG. 4 shows the effect of the calcination temperature on the total acidity of VTPATi, VMPATi, and VTSiATi catalysts.

It is known that the surface modified or promoted $V_2O_5$ catalysts showed similar type of performance in terms of alkali resistance. Influence of calcination temperature on acidity of the VTPATi, VMPATi, and VTSiATi catalysts is shown in FIG. 4. There is a gradual decrease in acidity of the catalysts when temperature is raised. The loss in acidity could be due to support phase transformations and HPAs decomposition which is also evident from the XRPD patterns. It is known that the HPAs are sensitive to high temperature and they loose acidic protons with increasing temperature and usually, tungsten HPAs are more stable compounds.

Figure 5A:
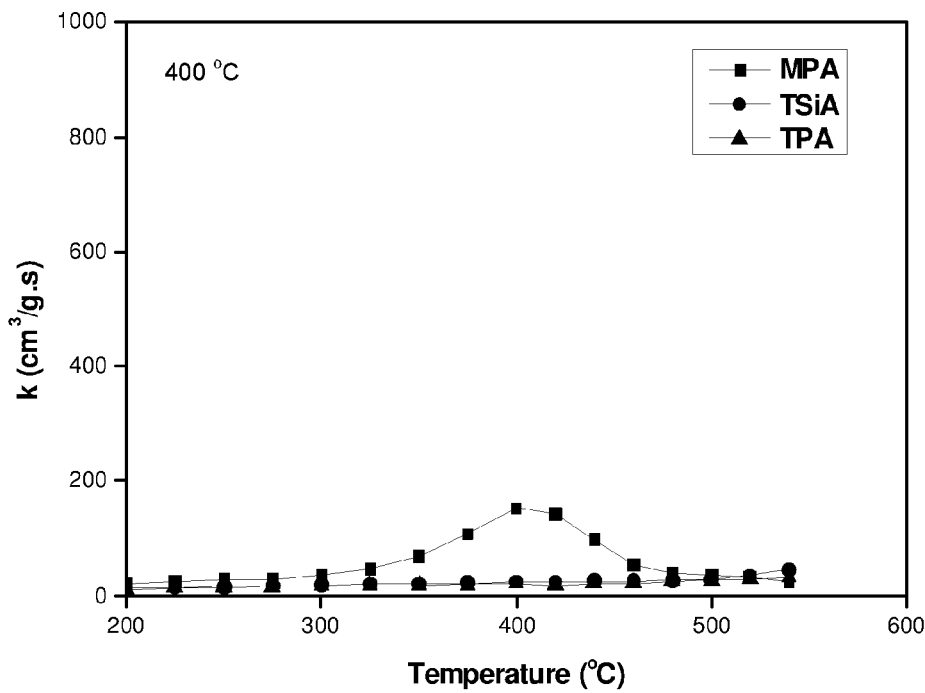
FIGS. 5a-b show the temperature dependency of the first-order rate constant for the SCR of NO with TPA, MPA, and TSiA catalysts calcined at 400° C.
Figure 5B:
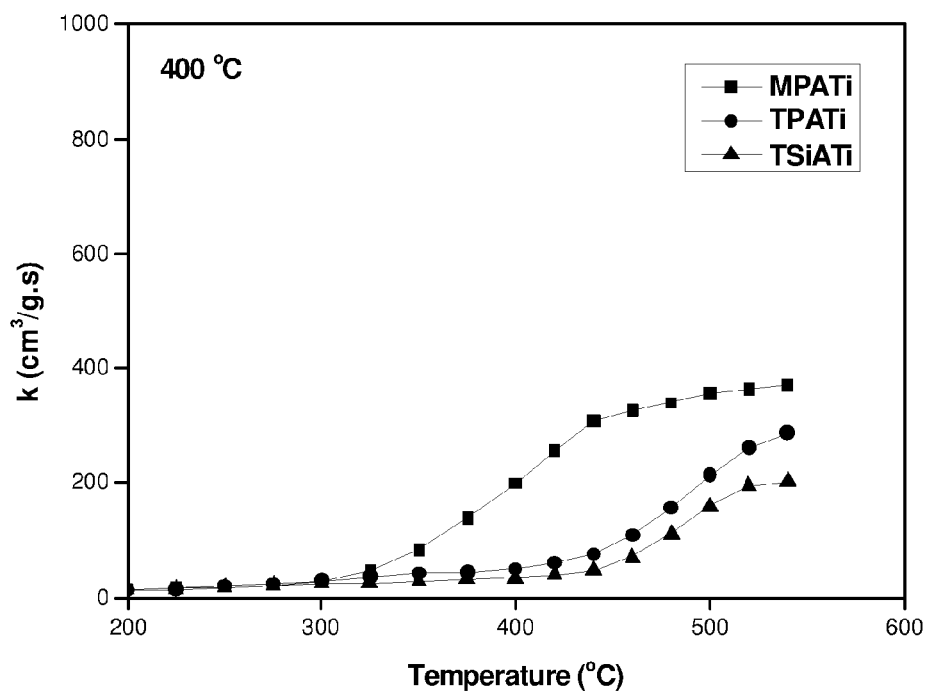

The catalytic activity of the MPA, TPA, TSiA, MPATi, TPATi and TSiATi catalysts was measured in the temperature range 200-540° C. In FIGS. 5a-b the catalytic activities obtained are shown as the first-order mass-based rate constant k ($cm^3/g \cdot s$). While measuring the rate constant values catalyst amount is chosen in such a way that the NO conversion values are well below 90% to maintain total catalyst bed in reaction condition. All the measurements are recorded after steady state conditions.

Pure HPAs showed very little SCR activity. $TiO_2$ supported MPA, TPA, and TSiA catalysts calcined at 400° C. showed appreciable catalytic activity as shown in FIG. 5b. The order of the catalytic activity is MPATi>TPATi>TSiATi and these catalysts are performing comparatively at high reaction temperatures.

Figure 6A:
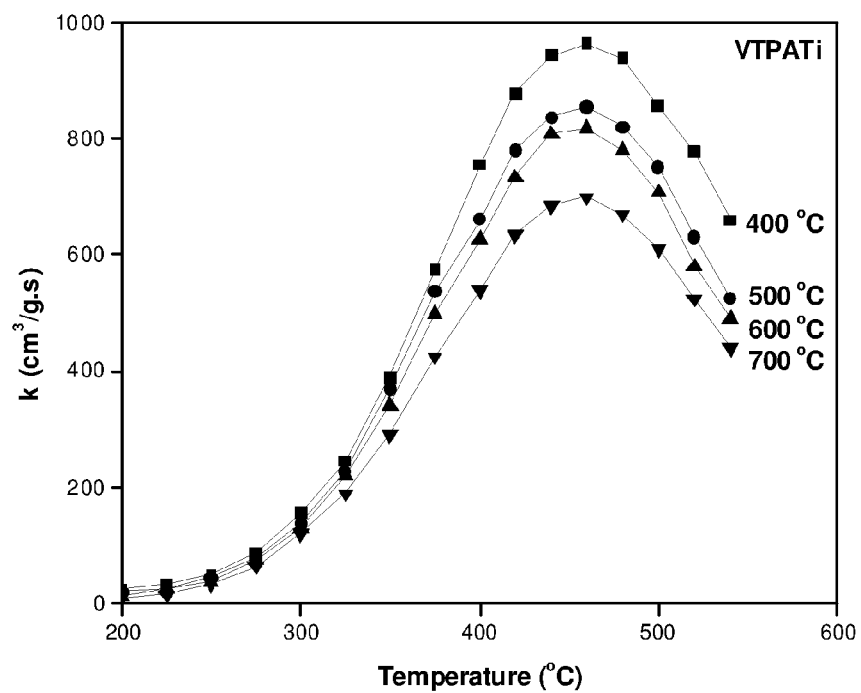
FIGS. 6a-c show the temperature dependency of the first-order rate constant for the SCR of NO with fresh VTPATi (FIG. 6a), fresh VMPATi (FIG. 6b), and fresh VTSiATi (FIG. 6c) catalysts calcined at the indicated temperature (° C.) and FIG. 6d show the temperature dependency of the first-order rate constant for the SCR of NO with deactivated catalysts calcined at 400° C. The reaction conditions are 1000 ppm NO, 1100 ppm $NH_3$, 3.5% $O_2$, 2.3% $H_2O$, and balance $N_2$.
Figure 6B:
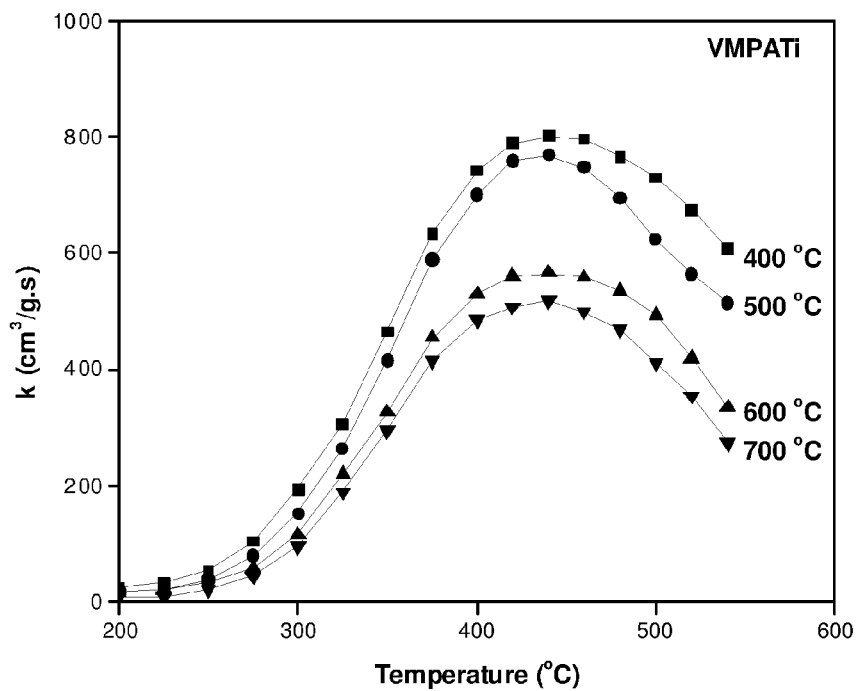
Figure 6C:
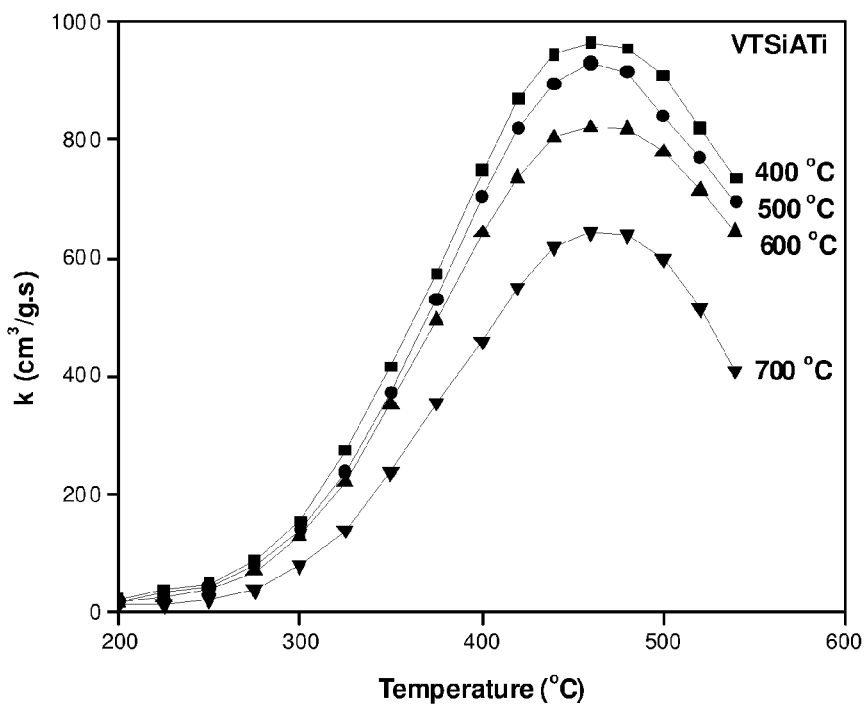

Catalytic activity of VHPATi catalysts calcined at between 400-700° C. is shown in FIGS. 6a-c. VTPATi (FIG. 6a), VMPATi (FIG. 6b), and VTSiATi (FIG. 6c) catalysts showed maximum activity at 400° C. calcination temperature and the catalysts calcined at 500° C., 600° C. and 700° C. were comparatively less active than the catalysts calcined at 400° C. From the calcination effect it is evident that the HPAs are sensitive to the calcination process. Further, low calcination temperatures are not studied since optimum reaction temperatures are around 400° C. and inactive amorphous $TiO_2$ phase can be seen. At 400° C. calcination temperature the catalyst has rich anatase phase and there is no crystalline $V_2O_5$ or HPAs. Further increase in calcination temperature leads to that there is a partial transformation of anatase to rutile phase and chances of formation of less active HPAs decomposition products ($WO_3$ or $MoO_3$). It is evident that $WO_3$ and $MoO_3$ are excellent promoters. In the present case, when they are in stable HPA form, they have high acidity and SCR activity as well.

Yoshimoto et al. [Appl. Catal. B, vol 75 (2007), p. 175] performed SCR with various aromatic hydrocarbons on Pd-TPA/$SiO_2$ and ultimately they couldn't achieve 100% NO conversion and $N_2$ selectivity was very poor. The present catalysts are highly active and very less $NH_3$ slip shows the selective or proper utilization of reducing agents on these catalysts. For the VMPATi catalysts $k_{max}$ values are observed at 440° C. and with further increase in reaction temperature the activity decreases. VTPATi and VTSiATi catalysts showed $k_{max}$ at 460° C. Also here, a further increase in reaction temperature induces a decrease in activity due to predominant ammonia oxidation (SCO) rather than SCR.

Low temperature activity of VMPATi catalyst is well appreciated and all thermal deactivations could be easily avoided with low temperature performance catalysts. Overall, VMPATi, VTPATi and VTSiATi catalysts showed $k_{max}$ values of 803, 966 and 963 $cm^3/g \cdot s$ respectively at their optimum conditions. The rate constant values are much higher than the commercial $V_2O_5$—$WO_3$/$TiO_2$ catalyst and highly active $V_2O_5$/Sulphated-$ZrO_2$ catalysts (430 $cm^3/g \cdot s$). This critical comparison with the mass based rate constant gives clear idea about the HPAs ability to enhance the SCR.

Jentys et al. [Catal. Today vol. 59 (2000) p. 313] performed SCR on Pt-TPA on MCM-41 (Mobil Composition of Matter No. 41) with $C_3H_6$ as a reducing agent, and they could not achieve 100% NOx conversion and also $C_3H_6$ slip was large. Pt-TPA/MCM-41 catalysts are sensitive to water and high concentration of oxygen and it has very less operational window for the reaction. Thermal stability of VHPAs can be best compared at 700° C. with the help of XRD and SCR activity. At 700° C. SCR activity and anatase phase intensities of XRD are in the order of VTPATi>VTSiATi>VMPATi. Overall $WO_3$ containing VTPA and VTSiA catalysts are much more active than $MoO_3$ containing VMPA catalysts.

Figure 6D:
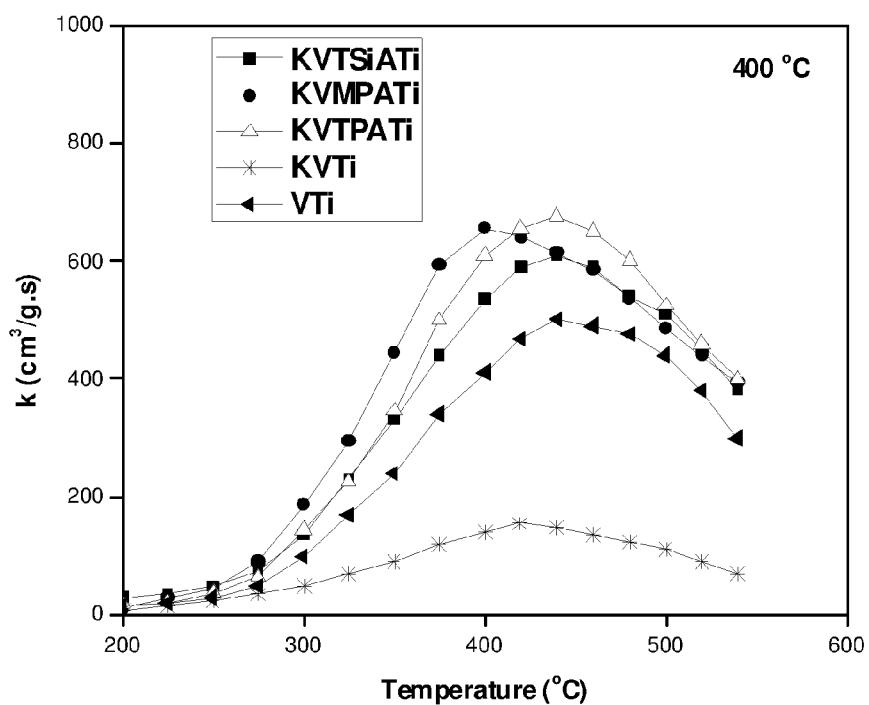

Doping the optimum catalysts with potassium (K\V molar ratio=0.3 or 100 µmol/g) resulted in decrease in activity and a small shift of $k_{max}$ towards lower temperature (FIG. 6d). A possible explanation for such a temperature shift is that the potassium loading reduced the activity of the main NO-SCR reaction while the rate of the side reaction of ammonia oxidation remained constant or even increased.

All the potassium doped HPA catalysts showed similar profiles as that of undoped catalysts. KVMPATi catalyst showed $k_{max}$ value at 400° C. and VTPATi and VTSiATi catalysts showed $k_{max}$ at 440° C. Especially the showed decrease in $k_{max}$ from 500 to 155 cm$^3$/g·s of the KVTi catalyst implies the severe poisoning effect of alkali in the absence of HPAs. On VTi catalyst, potassium seems to preferably coordinate with the vanadium sites and make them inactive for the SCR reaction.

HPA promoted catalysts showed better deactivation resistance as compared to that of VTi catalyst. KVTi catalysts showed a relative activity of 33% and that of KVMPATi, KVTPATi, KVTSiATi catalysts showed 88%, 81%, 71%, respectively at 400° C. (FIG. 7). For all catalysts the deactivation increases with reaction temperature which is connected with the shift of the maximum activity towards lower temperatures for potassium-poisoned catalysts. Especially, KVMPATi catalyst is very much resistive to alkali poisons as compared to other catalysts. This could be due to the low temperature performance of this catalyst as well as its moderate loss of acidity after potassium poisoning. Consequently, the potassium deactivation was significantly less in the present catalysts compared to that of traditional SCR catalysts. Highly active $V_2O_5$—$WO_x$/$ZrO_2$ catalyst reported in literature for biomass fired applications showed 40% relative activity even with a less potassium concentration of only 80 μmol/g.

Figure 8A:
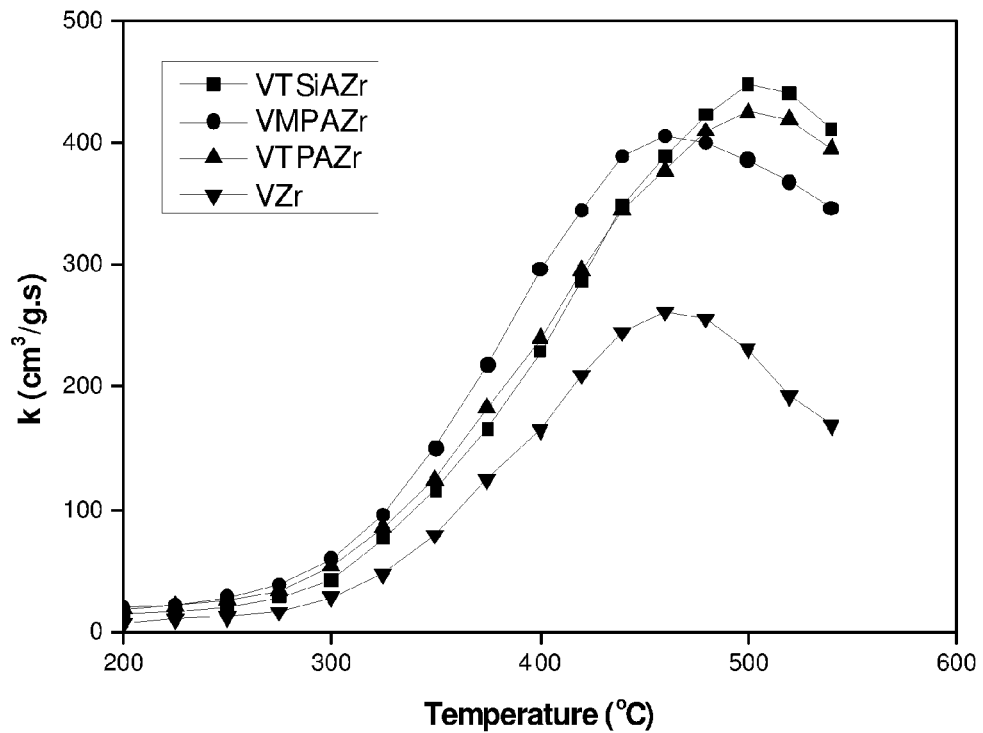
FIGS. 8a-b show the temperature dependency of the first-order rate constant for the SCR of NO with fresh (FIG. 8a) and deactivated (FIG. 8b) VTPAZr (VTPA-ZrO$_2$), VMPAZr (VMPA-ZrO$_2$), VTSiAZr (VTSiA-ZrO$_2$) and VZr (V—ZrO$_2$) catalysts calcined at 400° C. The reaction conditions are 1000 ppm NO, 1100 ppm $NH_3$, 3.5% $O_2$, 2.3% $H_2O$, and balance $N_2$.
Figure 8B:
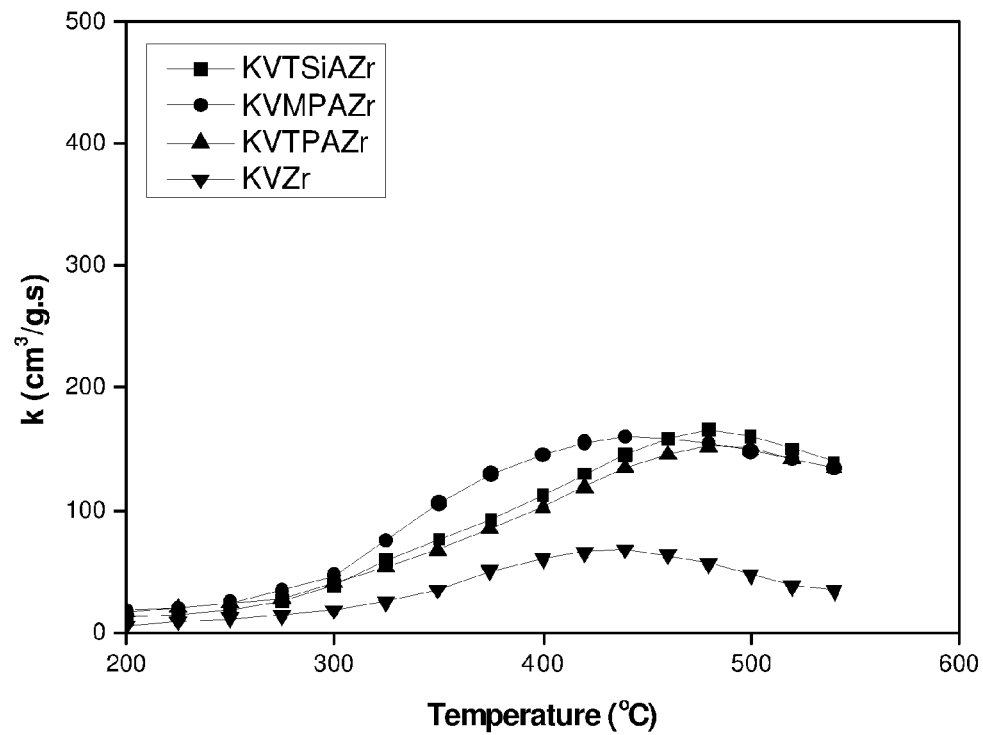

The catalytic activity of the fresh and deactivated VTPAZr (VTPA-ZrO$_2$), VMPAZr (VMPA-ZrO$_2$), VTSiAZr (VTSiA-ZrO$_2$) and VZr (V—ZrO$_2$) catalysts calcined at 400° C. was measured in the temperature range 200-540° C. In FIGS. 8a-b the catalytic activities obtained are shown as first-order mass-based rate constant k (cm$^3$/g·s) with results from the fresh catalyst in FIG. 8a and the deactivated catalysts in FIG. 8b.

VTPAZr, VMPAZr, VTSiAZr and VZr catalysts showed maximum rate constant value of 425, 405, 448 and 262 cm$^3$/g·s, respectively. As with of TiO$_2$ support, results with ZrO$_2$ support showed an enhanced activity of the HPAs promoted catalysts (VTPAZr, VMPAZr and VTSiAZr) compared to the unpromoted VZr catalyst.

Doping the optimum catalysts with potassium (K\V molar ratio=0.3 or 100 μmol/g) resulted in decrease in activity. KVTPAZr, KVMPAZr, KVTSiAZr and KVZr catalysts showed maximum rate constant value of 152, 160, 165 and 68 cm$^3$/g·s, respectively. Overall, HPA promoted ZrO$_2$ catalysts showed high initial activity and deactivation resistance as compared to that of VZrO$_2$ catalyst.

Heteropoly acid promoted $V_2O_5$/TiO$_2$ catalysts showed excellent alkali deactivation resistance compared to unpromoted $V_2O_5$/TiO$_2$ catalysts. These promoted catalysts are sensitive to high calcination temperature since there is a total acidity loss and inactive products transformation. When WO$_3$ or MoO$_3$ are in stable heteropoly acid matrix they showed higher activity than in the decomposition state. Heteropoly acid promoted $V_2O_5$/TiO$_2$ catalysts are promising catalysts for coal fired as well as biomass fired power plant SCR applications.

Figure 9A:
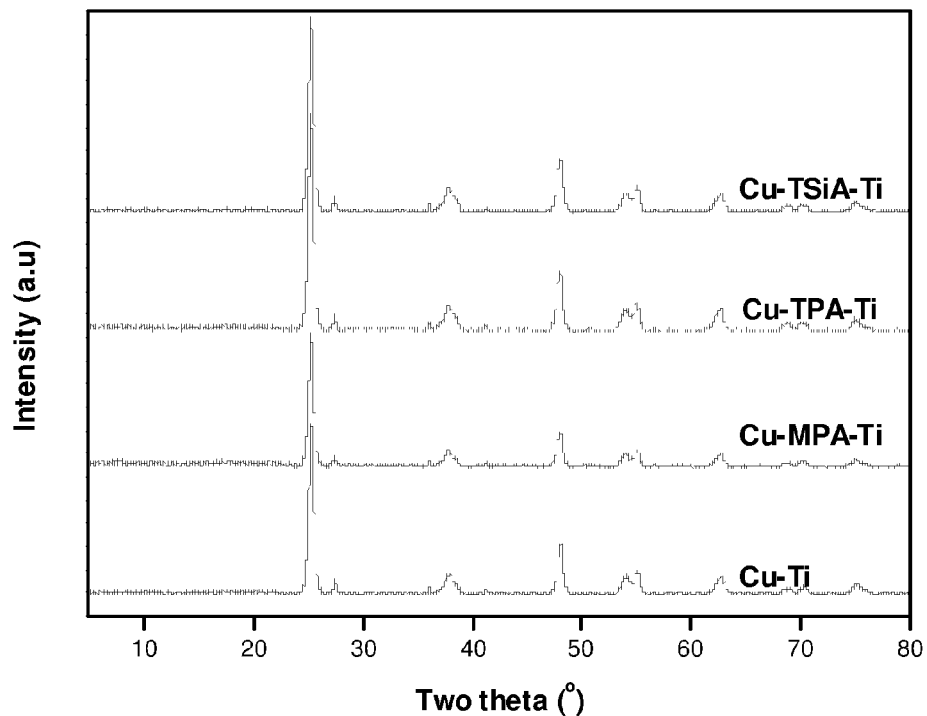
FIG. 9a shows XRPD patterns of Cu-TPATi (Cu/TPA-TiO$_2$), Cu-MPATi (Cu/MPA-TiO$_2$), and Cu-TSiATi (Cu/TSiA-TiO$_2$) catalysts.
Figure 9B:
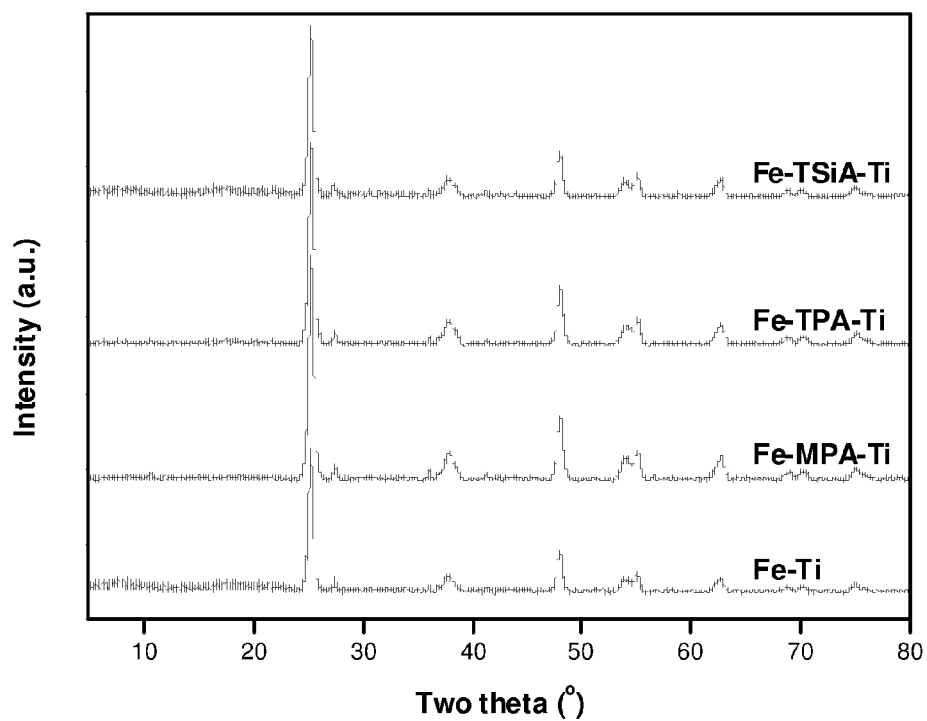
FIG. 9b shows XRPD patterns of Fe-TPATi (Fe/TPA-TiO$_2$), Fe-MPATi (Fe/MPA-TiO$_2$), and Fe-TSiATi (Fe/TSiA-TiO$_2$) catalysts.
Figure 10A:
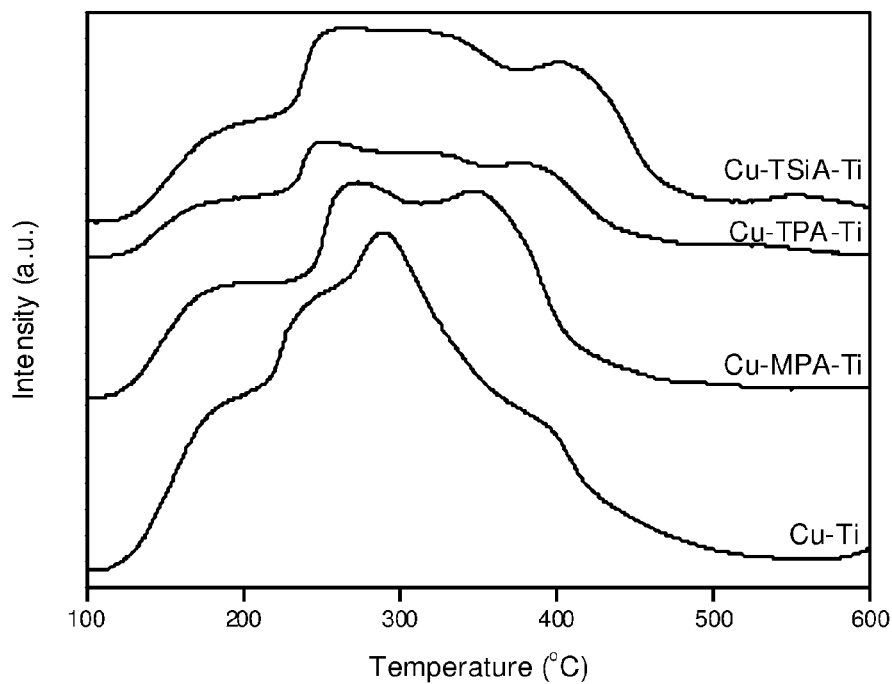
FIGS. 10a-b show $NH_3$-TPD profiles of fresh (FIG. 10a) and deactivated (FIG. 10b) Cu-TPATi, Cu-MPATi, and Cu-TSiATi catalysts.
Figure 10B:
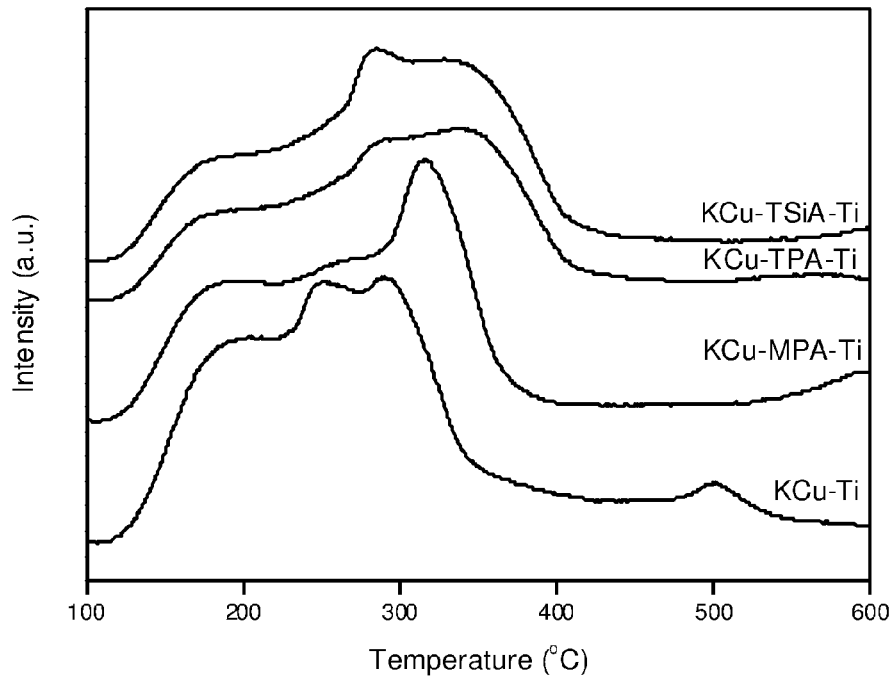
Figure 10C:
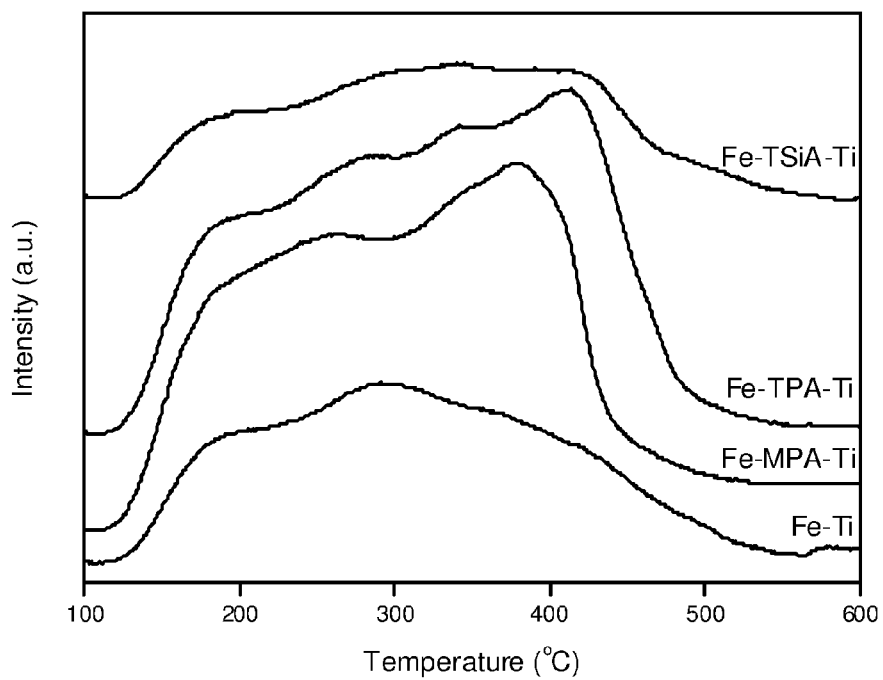
FIGS. 10c-d show $NH_3$-TPD profiles of fresh (FIG. 10c) and deactivated (FIG. 10d) Fe-TPATi, Fe-MPATi and Fe-TSiATi catalysts.
Figure 10D:
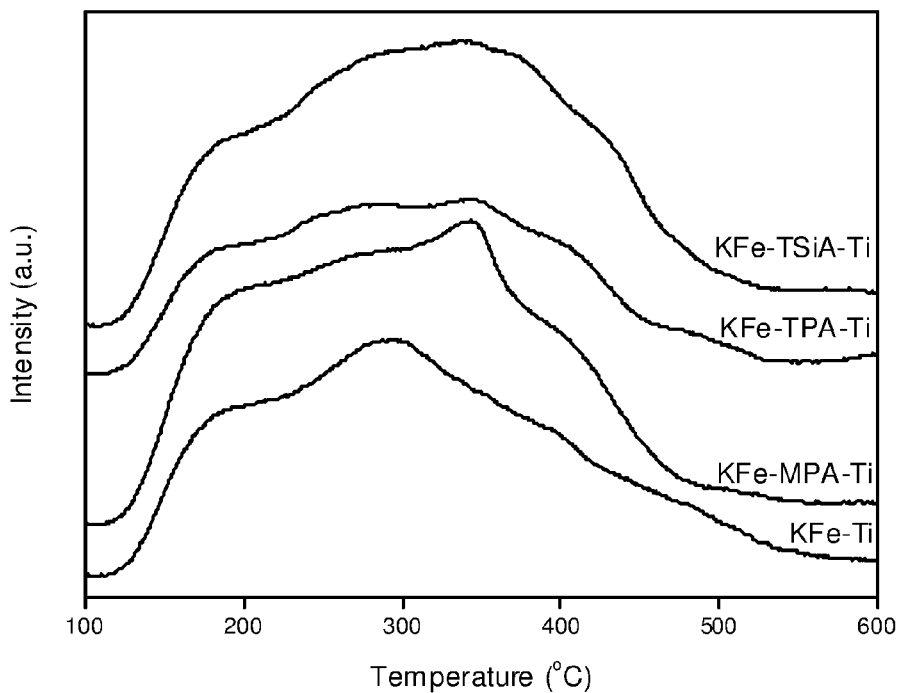

Potential alternatives to the toxic vanadium-based systems are copper and iron metal catalysts. The XPRD patterns of Cu—Ti and Fe—Ti catalysts along with HPA promoters are showed in FIGS. 9a-b. No diffractions lines attributing to crystalline CuO or Fe$_2$O$_3$ were observed, only support TiO$_2$ patterns can be observed indicating that the CuO or Fe$_2$O$_3$ are in a highly dispersed or amorphous state on the surface of the support. Both anatase (2θ=25.3°, 37.9°, 47.8° and 54.3°) and very small rutile (2θ=27.4°, 36.1°, and 54.2°) support phases are present in all catalysts. Further, there are no phases HPAs and their decomposition products (like MoO$_3$ and WO$_3$) indicate that the HPAs are highly dispersed and thermally stable at this calcinations temperature. In the presence of neutral supports like TiO$_2$ HPAs are thermally stable up to 700° C. Potassium doped catalysts also showed similar XPRD patterns as that of fresh catalysts (not shown in Figure).

Surface area values of Cu and Fe catalysts are presented in Table 4. The surface area of the Cu—Ti and Fe—Ti catalyst showed values of 128 and 120 m$^2$/g, respectively. The HPA promoted catalysts showed values in the range of 90-110 m$^2$/g. For most of the catalysts it is known that with an increase in metal content on the surface of the support pore blocking phenomena can be expected.

TABLE 4

Surface area and NH3—TPD results of fresh and deactivated (K-doped) catalysts calcined at 400° C.

| Catalyst | Surface area (m$^2$/g) | Acidity (μmol/g) Fresh | Acidity (μmol/g) K-doped | $T_{max}$ of desorption Fresh | $T_{max}$ of desorption K-doped |
|---|---|---|---|---|---|
| Cu—Ti | 128 | 490 | 190 | 291 | 288 |
| Cu—MPA—Ti | 95 | 687 | 455 | 349 | 316 |
| Cu—TPA—Ti | 108 | 745 | 536 | 386 | 341 |
| Cu—TSiA—Ti | 115 | 630 | 514 | 405 | 338 |
| Fe—Ti | 122 | 452 | 200 | 293 | 291 |
| Fe—MPA—Ti | 92 | 709 | 515 | 380 | 342 |
| Fe—TPA—Ti | 100 | 613 | 505 | 412 | 347 |
| Fe—TSiA—Ti | 108 | 683 | 540 | 419 | 344 |

NH$_3$-TPD is used to evaluate the acidity of the catalysts. The ammonia desorption profiles of the Cu, Fe and potassium doped samples are presented in FIGS. 10a-d. The total amount of desorbed ammonia and $T_{max}$ of desorption are listed in Table 4. The total amount of adsorbed ammonia corresponds to molecular adsorbed ammonia or ammonium ions on Lewis or Brønsted acid sites. The relative strength of the acid sites are reflected by the temperature of maximum ammonia desorption.

The NH$_3$-TPD profile of the Fresh Cu—Ti and Fe—Ti catalyst showed primarily a sharp desorption temperature peak around 290° C., whereas the Cu-HPA-Ti and Fe-HPA-Ti catalysts showed a broad desorption peak above 350° C. The high temperature desorption peaks are purely due to Brønsted acid sites from the promoted HPAs. From Table 4 Cu—Ti and Fe—Ti catalysts showed total acidity values of 490 μmol/g and 452 μmol/g, respectively. Cu-HPA-Ti and Fe-HPA-Ti catalysts showed higher acidity values above 630 μmol/g could indicate that the super acidic nature of these promoters. The acid strength of the fresh HPA-promoted samples follow the order: Cu-TSiA-Ti>Cu-TPA-Ti>Cu-MPA-Ti>Cu—Ti, whereas the surface acidity values are in the order: Cu-TPA-Ti>Cu-MPA-Ti>Cu-TSiA-Ti>Cu—Ti. Fresh Fe-HPA-Ti catalysts also showed similar acid strength order as that of Cu-HPA-Ti catalysts, whereas the surface acidity values are in the order: Fe-MPA-Ti>Fe-TSiA-Ti>Fe-TPA-Ti>Fe—Ti. Overall HPAs promoted catalysts showed high surface acidity and acid strength compared to that of unpromoted catalysts.

The $NH_3$ desorption profiles of the potassium-poisoned catalysts showed decrease in surface acidity as reported in Table 4. On all catalysts, the doping is associated with a decrease in acid strength, in agreement with earlier reports. The weakening of the acid site is due to the occupation of potassium on the strongest acid site, which decreases the strength of the remaining acid sites through electron donation. Especially KCu—Ti and KFe—Ti catalysts showed acidity drop of 61% and 55%, respectively. KCu-HPA-Ti and KFe-HPA-Ti catalysts showed maximum acidity drop of 33% only. Similar alkali resistivity results were observed on $TiO_2$ and $ZrO_2$ surface modified catalysts.

Figure 11A:
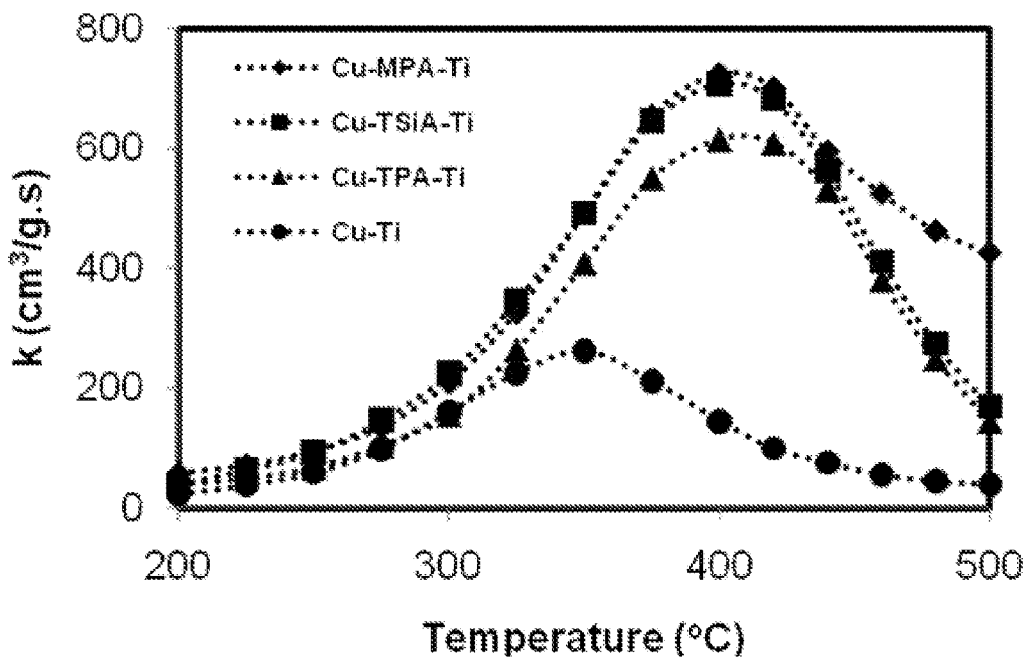
FIGS. 11a-b show the temperature dependency of the first-order rate constant for the SCR of NO with fresh (FIG. 11a) and deactivated (FIG. 11b) Cu-TPA, Cu-MPA and Cu-TSiA catalysts. The reaction conditions are 1000 ppm NO, 1100 ppm $NH_3$, 3.5% $O_2$, 2.3% $H_2O$, and balance $N_2$.
Figure 11B:
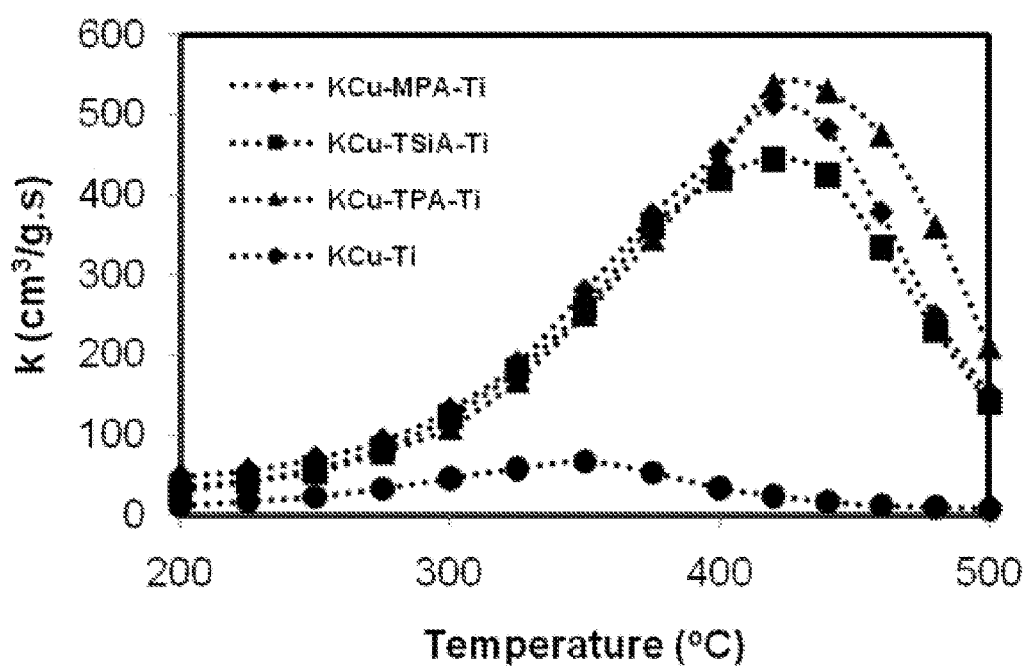

The SCR activity of the fresh and potassium doped Cu catalysts were measured in the temperature range 200-500° C. In FIGS. 11a-b the catalytic activities obtained are shown as first-order mass based rate constant k ($cm^3/g \cdot s$). The catalytic activity is increasing with increase of reaction temperature and reaches an optimum temperature. At further increase in temperature, the SCR activity is decreases due to predominant ammonia oxidation than SCR.

HPAs promoted catalysts showed better activity compared to that of unpromoted Cu—Ti catalyst. The order of the catalytic activity of the fresh catalysts are Cu-MPA-Ti>Cu-TSiA-Ti>Cu-TPA-Ti>Cu—Ti. All three Cu-HPA-Ti catalysts showed maximum activity at 400° C. and that of Cu—Ti catalyst showed at 350° C. Such a difference in $T_{max}$ performance during SCR is due to the redox properties of the catalysts. Over all Cu-MPA-Ti, Cu-TSiA-Ti, Cu-TPA-Ti and Cu—Ti catalysts showed $k_{max}$ value of 724, 709, 616 and 262 $cm^3/g \cdot s$, respectively, at their $T_{max}$ temperatures.

For the comparison of the present catalysts no such reports are available in literature for the SCR of NO with $NH_3$ on HPAs promoted catalysts. Yoshimoto et al. [Appl. Catal. B vol. 75 (2007) p. 175] performed SCR with various aromatic hydrocarbons on Pd-TPA/$SiO_2$ and ultimately they couldn't achieve 100% NO conversion and $N_2$ selectivity is very poor. The rate constant values are much higher than the commercial $V_2O_5$—$WO_3$/$TiO_2$ catalyst and highly active $V_2O_5$/Sulphated-$ZrO_2$ catalysts (430 $cm^3/g \cdot s$). Potassium doped Cu catalysts with potassium levels of 100 µmol/g resulted in decrease of SCR activity. Especially, unpromoted KCu—Ti catalyst is deactivated very severely. KCu-MPA-Ti, KCu-TSiA-Ti, KCu-TPA-Ti and KCu—Ti catalysts showed $k_{max}$ value of 513, 445, 537 and 67 $cm^3/g \cdot s$ respectively at their $T_{max}$ temperatures.

Figure 12A:
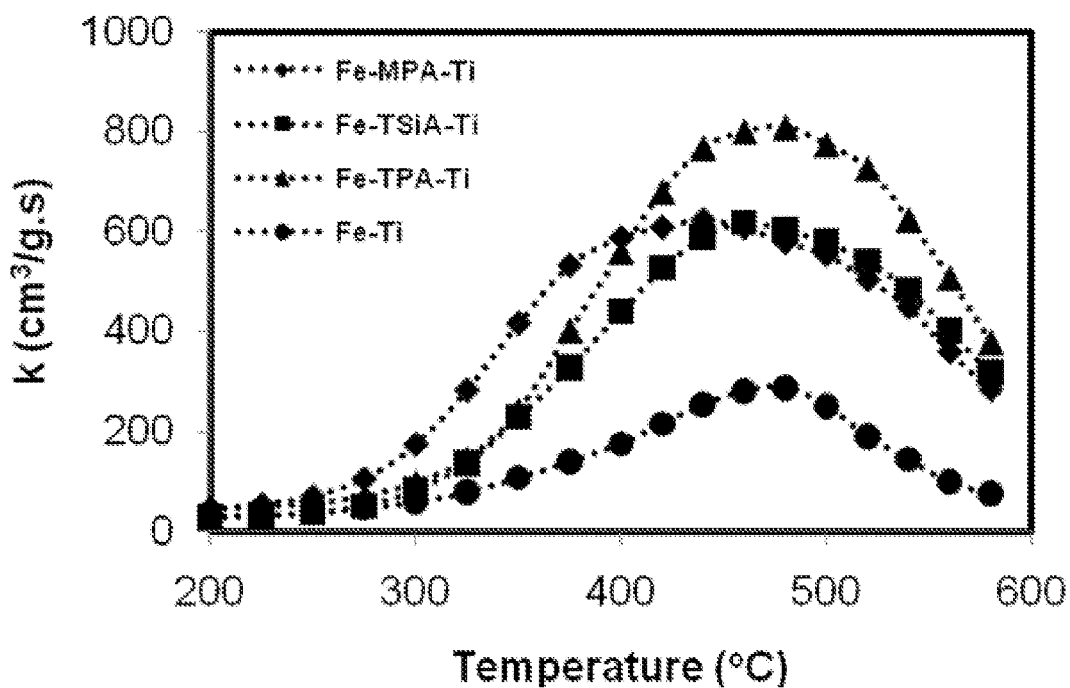
FIGS. 12a-b show the temperature dependency of the first-order rate constant for the SCR of NO with fresh (FIG. 12a) and deactivated (FIG. 12b) Fe-TPA, Fe-MPA and Fe-TSiA catalysts. The reaction conditions are 1000 ppm NO, 1100 ppm $NH_3$, 3.5% $O_2$, 2.3% $H_2O$, balance $N_2$.
Figure 12B:
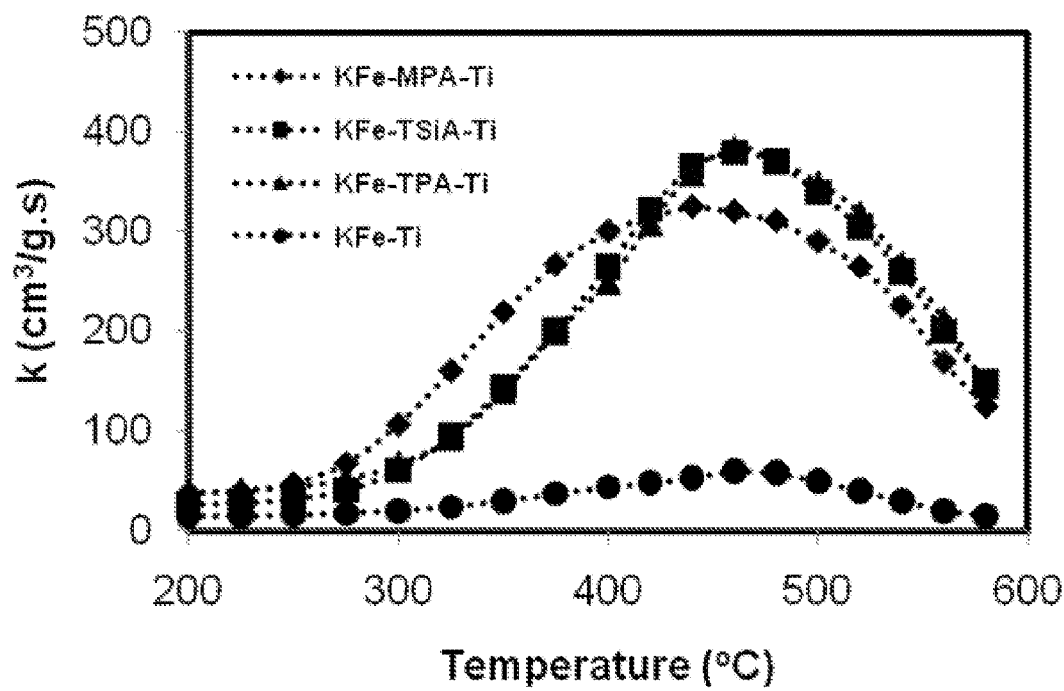

The SCR activity of the fresh and potassium doped Fe catalysts were measured in the temperature range 200-580° C. (FIGS. 12a-b). Fe catalysts are showing maximum catalytic activity at higher temperatures (440-480° C.) compared to that of Cu catalysts. The order of the catalytic activity of fresh catalysts is Fe-TPA-Ti>Fe-MPA-Ti>Fe-TSiA-Ti>Fe—Ti. Over all Fe-MPA-Ti, Fe-TSiA-Ti, Fe-TPA-Ti and Fe—Ti catalysts showed $k_{max}$ value of 625, 619, 810 and 288 $cm^3/g \cdot s$, respectively, at their $T_{max}$ temperatures.

The order of the catalytic activity and $k_{max}$ values are changing from metal to metal could be due to the difference in redox properties. In the Cu series catalysts molybdenum containing MPA was more active and that of the Fe series catalysts are more active on tungsten containing TPA. Potassium doped Fe catalysts are also resulted in decrease of SCR activity. KFe-MPA-Ti, KFe-TSiA-Ti, KFe-TPA-Ti and KFe—Ti catalysts showed $k_{max}$ value of 325, 380, 385 and 60 $cm^3/g \cdot s$ respectively, at their $T_{max}$ temperatures. The observed change in catalytic activity after doping with potassium seemed to correlate well with the loss in total acidity of the catalysts (listed in Table 4).

Figure 13A:
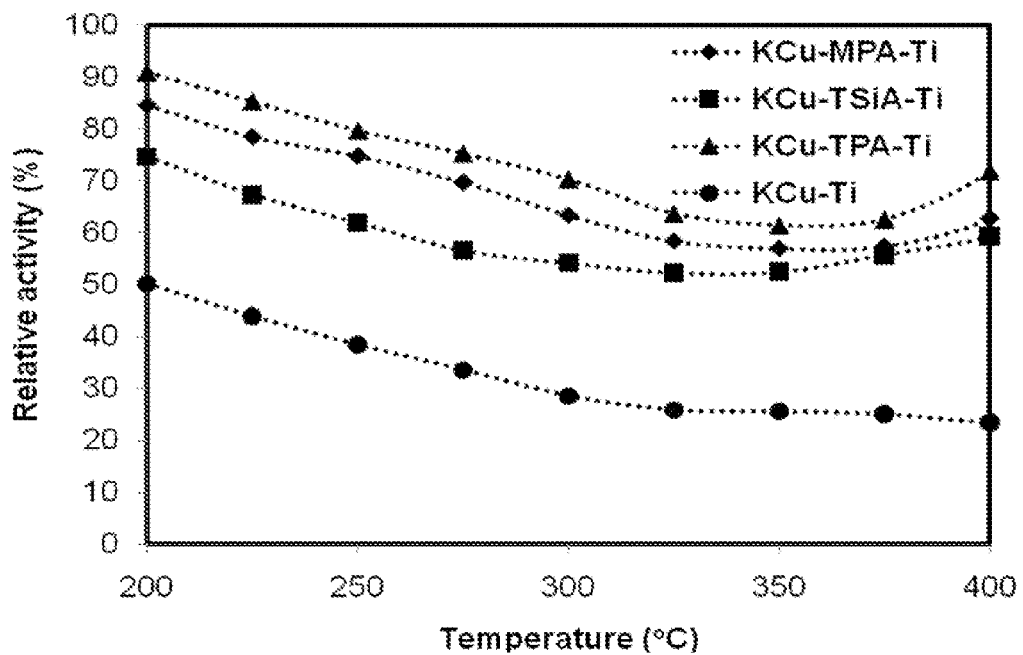
FIG. 13a shows the relative activity of Cu-TPA, Cu-MPA, Cu-TSiA, and unpromoted Cu catalysts on TiO$_2$.
Figure 13B:
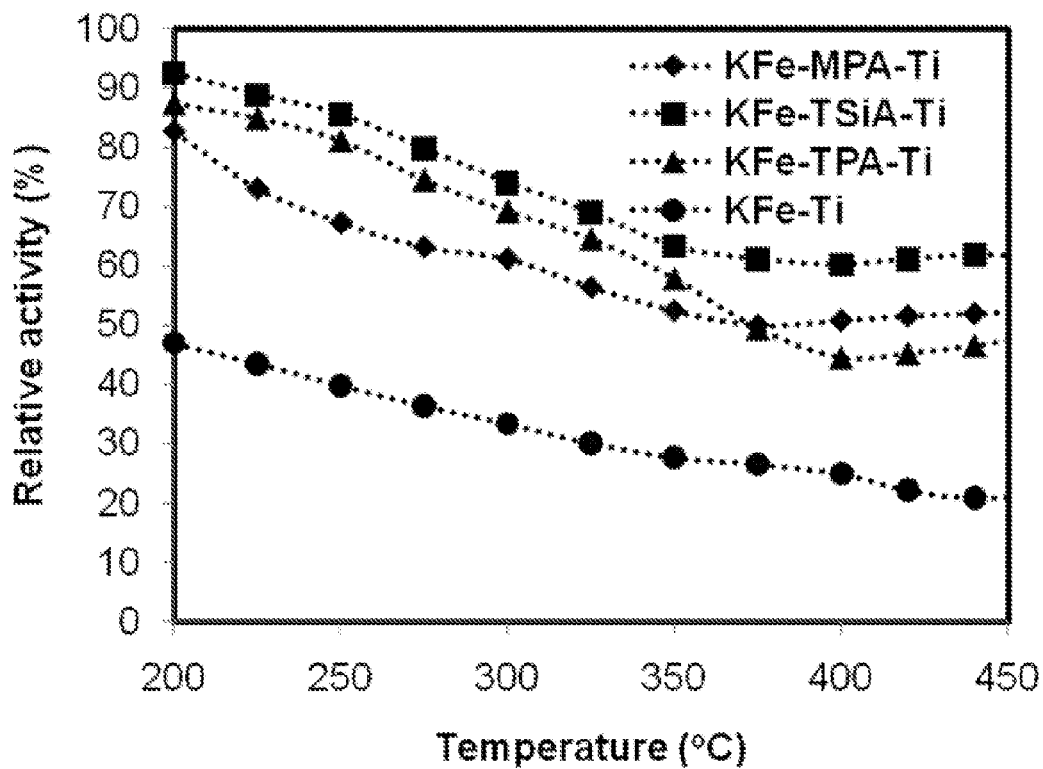
FIG. 13b shows the relative activity of Fe-TPA, Fe-MPA and Fe-TSiA and unpromoted Fe catalysts on TiO$_2$.
Figure 14:
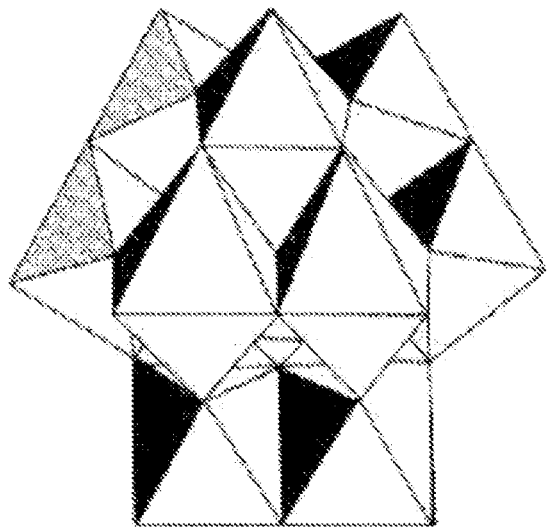
FIG. 14 shows HPA structures: A) a Keggin structure, and B) a Dawson structure.
Figure 14:
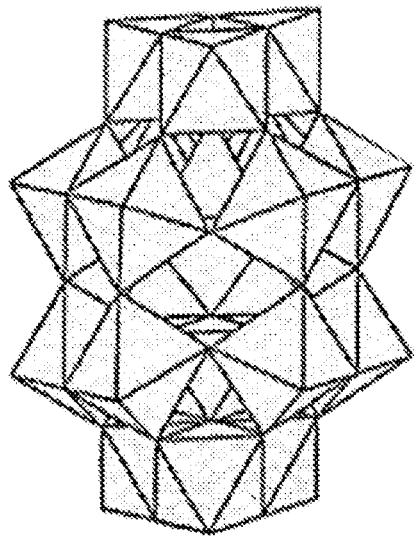

The decrease in activity after potassium doping is represented as relative activity (%) and is shown in FIGS. 13a-b. Relative activity of the catalysts decreases with reaction temperature. Cu—Ti catalysts showed a relative activity of 23% and that of Cu-MPA-Ti, Cu-TSiA-Ti and Cu-TPA-Ti catalysts showed 63%, 59%, 72%, respectively at 400° C. Fe—Ti catalysts showed a relative activity of 21% and that of Fe-MPA-Ti, Fe-TSiA-Ti and Fe-TPA-Ti catalysts showed 52%, 62%, 47%, respectively at 440° C.

For all the Cu-HPA promoted catalysts the deactivation increases with reaction temperature until around 350° C. where after a decrease in deactivation is seen when further raising the temperature. For all the Fe-HPA promoted catalysts a similar picture is seen; the deactivation increases with reaction temperature until around 400° C. where after a decrease in deactivation is seen when further raising the temperature.

Consequently, the potassium deactivation was significantly less in the present catalysts compared to that of traditional SCR catalysts. Highly active $V_2O_5$—$WO_x$/$ZrO_2$ catalyst reported in literature for biomass fired applications also showed severe deactivation. Overall HPAs promoted catalysts are very active and resistive to alkali poisons as compared to unpromoted catalysts.

Distributing the three heteropoly acids, MPA, TPA and TSiA, on Cu—Ti and Fe—Ti entailed a substantial increase in acid strength and surface acidity. All the HPAs promoted catalysts exhibited better SCR activity than that of unpromoted catalysts. The impact of potassium doping (100 µmol/g) on the Cu-HPA-Ti and Fe-HPA-Ti catalysts is less severe than on the corresponding unpromoted Cu—Ti and Fe—Ti catalysts. Heteropoly acid promoted Cu/$TiO_2$ or Fe/$TiO_2$ catalysts are promising catalysts for coal fired as well as biomass fired power plant SCR applications.

The invention claimed is:

1. A method of selectively removing nitrogen oxides from gases containing a significant amount of alkali metal and/or alkali earth compounds comprising exposing said gases to a heteropoly acid (HPA)-promoted catalyst comprising:
   a support material having an isoelectric point around 7,
   a catalytic active metal compound, and
   HPA as a promoter,
in the presence of a nitrogen containing compound selected from the group consisting of ammonia, ammonium salts, urea, a urea derivative and a solution of one or more of the foregoing.

2. The method according to claim 1 wherein the HPA has a Keggin structure.

3. The method according to claim 1, wherein the HPA is selected from the group consisting of TPA ($H_3PW_{12}O_{40}$), TSiA ($H_4SiW_{12}O_{40}$), MPA ($H_3PMo_{12}O_{40}$) and a mixture thereof.

4. The method according to claim 1, wherein the catalyst comprises 0.5-5% w/w of the catalytic active metal compound.

5. The method according to claim 1, wherein the catalytic active metal compound is selected from the group consisting of a vanadium compound, copper compound and an iron compound.

6. The method according to claim 5, wherein the support is impregnated with the vanadium compound, copper compound or the iron compound to achieve a final loading of 3% w/w of the catalytic active metal compound after calcination.

7. The method according to claim 1, wherein the catalyst comprises 5-30% w/w of the support material.

8. The method according to claim 1, wherein the support material is $TiO_2$.

9. The method according to claim 8, wherein the catalytic active metal compound is vanadium.

10. The method according to claim 1, wherein the support material is $ZrO_2$.

11. The method according to claim 10, wherein the catalytic active metal compound is vanadium.

12. A method for providing a heteropoly acid promoted catalyst, comprising the steps of:
    suspending a dried support material in an aqueous solution of an HPA of choice,
    drying the suspension mixture at about 120° C. for about 12 hours, creating a support,
    wet impregnating the support with a metal compound,
    drying the impregnated catalyst at about 120° C. for about 12 hours followed by calcination at 400-600° C. for about 4 hours.

13. A method according to claim 12, wherein the HPA has a Keggin type structure 4.

14. A method according to claim 13, wherein the HPA is selected from the group consisting of TPA, TSiA, MPA and a mixture thereof.

15. A method according to claim 12, wherein the support is impregnated with the metal compound to achieve a final loading of 0.5-5% w/w of the metal compound after calcination.

16. A method according to claim 12, wherein the support is impregnated with the HPA to achieve a final loading of 5-30% w/w of the support material after calcination.

17. A method according to claim 12, wherein the metal compound is selected from the group consisting of a vanadium compound, copper compound and an iron compound.

18. A method according to claim 17, wherein the impregnation is carried out with a vanadium compound, copper compound or an iron compound to achieve a final loading of 3% w/w of the catalytic active metal compound after calcination.

19. A catalyst obtainable by the method according to claim 12.

20. A process for the selective removal of nitrogen oxides with a nitrogen containing compound selected from the group consisting of ammonia, ammonium salts, urea, a urea derivative, and a solution of one or more of the foregoing from gases resulting from the burning of biomass, combined biomass-fossil fuel, or emerging from stationary waste incineration units, which gases contain significant amounts of alkali metal and/or alkali earth compounds, which process comprises using a catalyst obtainable by the method according to claim 12.

21. A process according to claim 20 for the selective removal of nitrogen oxides from gases at a temperature from about 200° C. to about 600° C.

22. A process according to claim 21 for the selective removal of nitrogen oxides from gases, where the temperature is around 400° C.

23. The method according to claim 1, wherein the catalyst comprises 2-3.5% w/w of the catalytic active metal compound.

24. A method according to claim 12, wherein the support is impregnated with the metal compound to achieve a final loading of 2-3.5% w/w of the metal compound after calcination.

25. A method according to claim 12, wherein the support is impregnated with the HPA to achieve a final loading of 10-20% w/w of the support material after calcination.

* * * * *